United States Patent
Guo et al.

(10) Patent No.: US 10,313,549 B2
(45) Date of Patent: Jun. 4, 2019

(54) APPARATUS AND METHOD FOR GENERATING TIME LAPSE IMAGE

(71) Applicant: SAMSUNG ELECTRONICS CO., LTD., Suwon-si, Gyeonggi-do (KR)

(72) Inventors: Kai Guo, Suwon-si (KR); Nak-hoon Kim, Suwon-si (KR); Sahil Arora, Suwon-si (KR); Duck-chan Seo, Yongin-si (KR); Hyung-chul Yoo, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 73 days.

(21) Appl. No.: 15/349,043

(22) Filed: Nov. 11, 2016

(65) Prior Publication Data

US 2017/0180589 A1   Jun. 22, 2017

(30) Foreign Application Priority Data

Dec. 22, 2015  (KR) ........................ 10-2015-0183931

(51) Int. Cl.
*H04N 1/21* (2006.01)
*H04N 5/77* (2006.01)
(Continued)

(52) U.S. Cl.
CPC ......... *H04N 1/2133* (2013.01); *H04N 5/2351* (2013.01); *H04N 5/23203* (2013.01);
(Continued)

(58) Field of Classification Search
CPC ............. H04N 1/2133; H04N 5/23216; H04N 5/23219; H04N 5/23241; H04N 5/23254;
(Continued)

(56) References Cited

U.S. PATENT DOCUMENTS 6,600,872 B1   7/2003  Yamamoto
6,904,184 B1   6/2005  Taylor
(Continued)

FOREIGN PATENT DOCUMENTS

EP   1 024 666   8/2000
EP   2 533 092   12/2012
(Continued)

OTHER PUBLICATIONS

Search Report and Written Opinion dated Feb. 21, 2017 in counterpart International Patent Application No. PCT/KR2016/012887.
(Continued)

*Primary Examiner* — Daniel M Pasiewcz
(74) *Attorney, Agent, or Firm* — Nixon & Vanderhye, P.C.

(57) ABSTRACT

A photographing apparatus is provided, including a photographing device comprising imaging circuitry configured to generate an image signal by photoelectric conversion of incident light, a processor comprising processing circuitry configured to determine a sampling interval of time lapse photographing over time based on a reference value acquired in real time while the time lapse photographing is performed, to sample a plurality of input frames generated from the image signal at the sampling interval while the time lapse photographing is performed, to stabilize a plurality of frames selected by sampling the plurality of input frames using a window determined based on the sampling interval, and to compress the plurality of selected frames at an output frame rate to generate a time lapse image file, and a storage configured to store the time lapse image file.

24 Claims, 24 Drawing Sheets

(51) Int. Cl.
  *H04N 5/232* (2006.01)
  *H04N 5/235* (2006.01)
  *H04N 5/783* (2006.01)
  *H04N 9/804* (2006.01)

(52) U.S. Cl.
  CPC ..... *H04N 5/23216* (2013.01); *H04N 5/23219* (2013.01); *H04N 5/23241* (2013.01); *H04N 5/23245* (2013.01); *H04N 5/23251* (2013.01); *H04N 5/23258* (2013.01); *H04N 5/23274* (2013.01); *H04N 5/23296* (2013.01); *H04N 5/772* (2013.01); *H04N 5/783* (2013.01); *H04N 9/8042* (2013.01)

(58) Field of Classification Search
  CPC .......... H04N 5/23258; H04N 5/23296; H04N 5/2351
  See application file for complete search history.

(56) References Cited

U.S. PATENT DOCUMENTS

| | | | |
|---|---|---|---|
| 8,319,859 | B2 | 11/2012 | Kim et al. |
| 2003/0007555 | A1 | 1/2003 | Divakaran et al. |
| 2007/0201817 | A1 | 8/2007 | Peker |
| 2009/0007202 | A1 | 1/2009 | Williams et al. |
| 2011/0279691 | A1 | 11/2011 | Ishii et al. |
| 2013/0336590 | A1 | 12/2013 | Sentinelli et al. |
| 2014/0036233 | A1 | 2/2014 | Posehn |
| 2014/0300769 | A1 | 10/2014 | Hartford |
| 2014/0376877 | A1 | 12/2014 | Nozaki |
| 2015/0043893 | A1 | 2/2015 | Nishizaka |
| 2015/0049217 | A1 | 2/2015 | Takahashi |
| 2016/0094801 | A1* | 3/2016 | Beysserie ................ H04N 5/91 386/226 |
| 2017/0359549 | A1* | 12/2017 | Baran .................... H04N 5/772 |

FOREIGN PATENT DOCUMENTS

| | | |
|---|---|---|
| JP | 2002-016877 | 1/2002 |
| JP | 2007-208406 | 8/2007 |
| JP | 2007-208922 | 8/2007 |
| JP | 2009-017184 | 1/2009 |
| JP | 2010-087899 | 4/2010 |
| JP | 2012-034309 | 2/2012 |
| JP | 2014-011628 | 1/2014 |
| KR | 10-2010-0028399 | 3/2010 |
| KR | 10-2014-0051626 | 5/2014 |

OTHER PUBLICATIONS

N. Joshi et al., "Real-Time Hyperlapse Creation via Optimal Frame Selection", *Siggraph*, 2015, 9 pages.
Extended Search Report dated May 28, 2018 in counterpart European Patent Application No. 16879169.7 (8 pages).

* cited by examiner

ZOOM IN          ZOOM OUT

INCIDENT LIGHT

ZOOMING

APPARATUS AND METHOD FOR GENERATING TIME LAPSE IMAGE

CROSS-REFERENCE TO RELATED APPLICATION

This application is based on and claims priority under 35 U.S.C. § 119 to Korean Patent Application No. 10-2015-0183931, filed on Dec. 22, 2015, in the Korean Intellectual Property Office, the disclosure of which is incorporated by reference herein in its entirety.

BACKGROUND

1. Field

The present disclosure relates generally to a photographing apparatus, a method of generating a time lapse image, and a computer-readable recording medium having recorded thereon a program code that performs the method of generating a time lapse image.

2. Description of Related Art

A time lapse image is generated by sampling and compressing frames such that a user may easily view a plurality of image frames through video within a short time. Compared with a moving picture, a time lapse image may view image frames photographed during a certain time within a short time and require a small storage space. Furthermore, a plurality of electronic devices provide a function of generating the time lapse image. In addition, since a time lapse image has a time difference between frames longer than a time difference between frames that are played back, a subject may seem to move discontinuously unlike the moving picture, thus providing a user with an effect and a feeling that are different from those of the moving picture. When the time lapse image is generated, it is required to select a meaningful image and appropriately select a sampling interval upon photographing.

SUMMARY

Embodiments of the present disclosure are provided to adjust a sampling interval in real time while sampling frames of a time lapse image.

Embodiments of the present disclosure are also provided to reduce a storage space and a post-processing required when the time lapse image is generated, by, for example, adjusting a sampling interval of the time lapse image in real time.

Embodiments of the present disclosure are also provided to enhance image stabilization performance by adjusting the sampling interval of the time lapse image in real time.

Additional aspects will be set forth in part in the description which follows and, in part, will be apparent from the description.

According to an aspect of an example embodiment, a photographing apparatus includes a photographing device comprising a camera configured to generate an image signal by photoelectric conversion of incident light, a processor comprising a processing circuitry configured to determine a sampling interval of time lapse photographing over time based on a reference value acquired in real time while the time lapse photographing is performed, to sample a plurality of input frames generated from the image signal at the sampling interval while the time lapse photographing is performed, to stabilize a plurality of frames selected by sampling the plurality of input frames using a window determined based on the sampling interval, and to compress the plurality of selected frames at an output frame rate to generate a time lapse image file, and a storage configured to store the time lapse image file.

The reference value acquired in real time may include at least one or a combination of a zooming value, a battery level, movement information of the photographing apparatus, an illumination value, an audio signal, movement information of a subject, presence of face detection, and a face size.

The reference value may include a zooming value, and the sampling interval may decrease when the zooming value increases, and the sampling interval may increase when the zooming value decreases.

The photographing apparatus may further include a battery configured to supply power to the photographing apparatus, wherein the reference value may include a battery level, and the sampling interval may increase when the battery level is less than a battery reference value.

The processing circuitry may extract subject movement information from the plurality of input frames, the reference value may include the subject movement information, and, in a tripod mode, the sampling interval may decrease when a movement magnitude of the subject increases, and the sampling interval may increase when the movement magnitude of the subject decreases.

The processing circuitry may detect a face from the plurality of input frames, the reference value may include face detection information, and the sampling interval may decrease when a face that was not detected from a previous frame is detected from a current frame, and the sampling interval may increase when a face that was detected from the previous frame is no longer detected from the current frame.

The processing circuitry may detect a face from the plurality of input frames, the reference value may include face detection information, and the sampling interval may decrease when a size of the detected face increases, and the sampling interval may increase when the size of the detected face decreases.

The photographing apparatus may further include a movement sensor configured to detect movement of the photographing apparatus, wherein the reference value may include a movement magnitude of the photographing apparatus, and the sampling interval may decrease when a movement magnitude of the photographing apparatus increases, and the sampling interval may increase when the movement magnitude of the photographing apparatus decreases.

The photographing apparatus may further include a movement sensor configured to detect movement of the photographing apparatus, in which the reference value may include movement information of the photographing apparatus, the sampling interval may decrease when the photographing apparatus is detected as operating in a panning mode, and while the photographing apparatus operates in the panning mode, the sampling interval may increase when a moving speed of the photographing apparatus decreases, and the sampling interval may decrease when the moving speed increases.

The photographing apparatus may further include a movement sensor configured to detect movement of the photographing apparatus, wherein the reference value may include movement information of the photographing apparatus, and the sampling interval may decrease when a moving speed of the photographing apparatus is equal to or greater than a reference value.

The photographing apparatus may further include an illumination sensor configured to detect illumination, the reference value may include an illumination value, and the sampling interval may be greater when the illumination value is less than a low-illumination reference value or when the illumination value is greater than a high-illumination reference value than the sampling interval when the illumination value is equal to or greater than the low-illumination reference value and equal to or less than the high-illumination reference value.

The photographing apparatus may further include a microphone configured to detect an audio signal, wherein the reference value may include the audio signal detected by the microphone, and the sampling interval may decrease when a predefined sound or word is detected from the audio signal.

According to an aspect of another example embodiment, a photographing apparatus includes: a photographing device comprising a camera configured to generate an image signal by photoelectric conversion of incident light; a sensor configured to detect movement information of the photographing apparatus; a processor comprising processing circuitry configured to determine a sampling interval of time lapse photographing over time based on the movement information of the photographing apparatus while the time lapse photographing is performed, to sample a plurality of input frames generated from the image signal at the sampling interval while the time lapse photographing is performed, and to compress a plurality of frames selected by sampling the plurality of input frames at an output frame rate to generate a time lapse image file; and a storage configured to store the time lapse image file.

The sampling interval may decrease when a movement magnitude of the photographing apparatus increases, and the sampling interval may increase when the movement magnitude of the photographing apparatus decreases.

According to an aspect of still another example embodiment, a method of generating a time lapse image includes: determining a sampling interval of time lapse photographing over time based on a reference value acquired in real time while the time lapse photographing is performed; sampling a plurality of input frames generated from an image signal of a photographing device at the sampling interval while the time lapse photographing is performed; stabilizing a plurality of frames selected by sampling the plurality of input frames, using a window determined based on the sampling interval; compressing the plurality of selected frames at an output frame rate to generate a time lapse image file; and storing the time lapse image file.

The reference value acquired in real time may include at least one or a combination of a zooming value, a battery level, movement information of the photographing apparatus, an illumination value, an audio signal, movement information of a subject, presence of face detection, and a face size.

The reference value may include a zooming value, and the sampling interval may decrease when the zooming value increases, and the sampling interval may increase when the zooming value decreases.

The reference value may include a battery level, and the sampling interval may increase when the battery level is less than a battery reference value.

The method may further include extracting movement information of a subject from the plurality of input frames, wherein the reference value may include the movement information of the subject, and, in a tripod mode, the sampling interval may decrease when a movement magnitude of the subject increases, and the sampling interval may increase when the movement magnitude of the subject decreases.

The method may further include detecting a face from the plurality of input frames, wherein the reference value may include face detection information, and the sampling interval may decrease when a face that was not detected from a previous frame is detected from a current frame, and the sampling interval may increase when a face that was detected from the previous frame is no longer detected from the current frame.

The method may further include detecting a face from the plurality of input frames, wherein the reference value may include face detection information, and the sampling interval may decrease when a size of the detected face increases, and the sampling interval may increase when the size of the detected face decreases.

The method may further include detecting movement of a photographing apparatus, wherein the reference value may include a movement magnitude of the photographing apparatus, and the sampling interval may decrease when a movement magnitude of the photographing apparatus increases, and the sampling interval may increase when the movement magnitude of the photographing apparatus decreases.

The method may further include detecting movement of a photographing apparatus, wherein the reference value may include movement information of the photographing apparatus, the sampling interval may decrease when the photographing apparatus is detected as operating in a panning mode, and while the photographing apparatus operates in the panning mode, the sampling interval may increase when a moving speed of the photographing apparatus decreases, and the sampling interval may decrease when the moving speed increases.

The method may further include detecting movement of the photographing apparatus, wherein the reference value may include movement information of the photographing apparatus, and the sampling interval may decrease when a moving speed of the photographing apparatus is equal to or greater than a reference value.

The reference value may include an illumination value, and the sampling interval may be greater when the illumination value is less than a low-illumination reference value or when the illumination value is greater than a high-illumination reference value than the sampling interval when the illumination value is equal to or greater than the low-illumination reference value and equal to or less than the high-illumination reference value.

The reference value may include an audio signal detected by a microphone, and the sampling interval may decrease when a predefined sound or word is detected from the audio signal.

According to an aspect of yet another example embodiment, a method of generating a time lapse image includes: detecting movement information of a photographing apparatus while time lapse photographing is performed; determining a sampling interval of the time lapse photographing over time based on the movement information of the photographing apparatus while the time lapse photographing is performed; sampling a plurality of input frames generated from an image signal of a camera of a photographing device at the sampling interval while the time lapse photographing is performed; compressing a plurality of frames selected by sampling the plurality of input frames at an output frame rate to generate a time lapse image file; and storing the time lapse image file.

The sampling interval may decrease when a movement magnitude of the photographing apparatus increases, and the sampling interval may increase when the movement magnitude of the photographing apparatus decreases.

According to an aspect of another example embodiment, a non-transitory computer-readable recording medium having recorded thereon a computer program code for executing the method is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
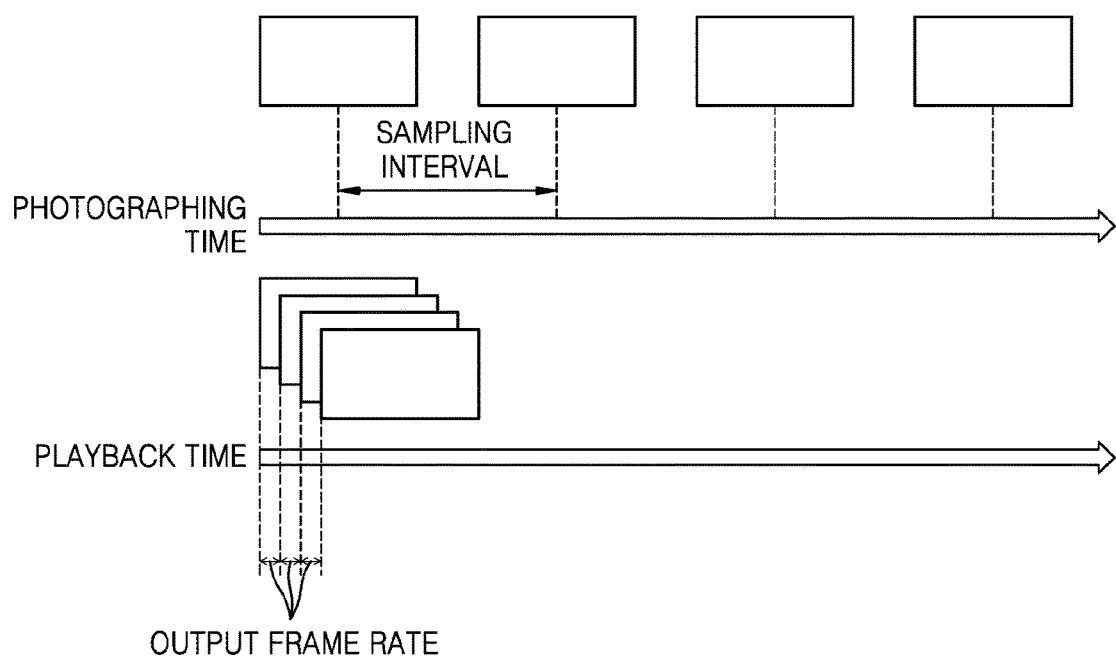
FIG. 1 is a diagram illustrating an example time lapse image.

Hereinafter, example embodiments of the present disclosure will be described in greater detail with reference to the accompanying drawings. The example embodiments may, however, be embodied in many different forms and should not be construed as being limited to the example embodiments set forth herein. In the accompanying drawings, portions irrelevant to a description of the example embodiments may be omitted for clarity. Moreover, like reference numerals refer to like elements throughout. As used herein, the term "and/or" includes any and all combinations of one or more of the associated listed items. Expressions such as "at least one of," when preceding a list of elements, modify the entire list of elements and do not modify the individual elements of the list.

In this disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when one part is referred to as "comprising (or including or having)" other elements, it should be understood that it can comprise (or include or have) only those elements, or other elements as well as those elements unless specifically described otherwise.

FIG. 1 is a diagram illustrating an example time lapse image.

A time lapse image may refer, for example, to an image having a photographing time difference between frames included in the time lapse image greater than a playback time difference therebetween. For example, the photographing time difference between the frames included in the time lapse image may be 10 seconds, and the playback time difference therebetween may be 0.1 seconds.

The time lapse image may be stored as a file including a plurality of frames. For example, the time lapse image may be compressed according to a standard such as Moving Picture Experts Group 4 (MPEG4), H.264/AVC, Windows Media Video (WMV), or the like, and may be stored as a video file using compressed frames. The time lapse image file may, for example be generated in various formats such as mpg, mp4, 3gpp, avi, asf, mov, etc.

The time lapse image may be generated by sampling a plurality of input frames photographed at a predetermined frame rate at a predetermined sampling interval and then compressing selected frames that are sampled at an output frame rate. The sampling interval may refer, for example, to an interval between the selected frames when the selected frames to be included in a time lapse image file are sampled from a plurality of input frames generated at a predetermined frame rate upon photographing. The sampling interval may be referred to as a time lapse speed. The sampling interval may be expressed as a time or may be included as a frame number. The selected frame may refer, for example, to a frame to be included in the time lapse image file among a plurality of input frames photographed at a predetermined frame rate. For example, when the sampling rate is 10 frames, and the plurality of photographed input frames includes frame 1 to frame 30, frame 1, frame 11, and frame 21 are determined as the selected frames, and frame 2 to frame 10, frame 12 to frame 20, and frame 22 to frame 30 may be discarded.

An output frame rate may refer, for example, to a frame rate in the time lapse image file. When the time lapse image file is played back, frames of the time lapse image file are played back at the output frame rate.

According to example embodiments of the present disclosure, a sampling rate may be determined in real time while a time lapse image is photographed, and sampling may be performed while the photographing is performed.

In this disclosure, the photographing of the time lapse image may denote that a photographing apparatus photographs an image while the photographing apparatus is set to a time lapse photographing mode. The time lapse photographing mode may be set upon a user's request or may be automatically set by a process performed by the photographing apparatus. The start and the end of the time lapse photographing may be determined by a control signal such as a shutter release signal received from the user or may be automatically determined by the photographing apparatus.

Figure 2:
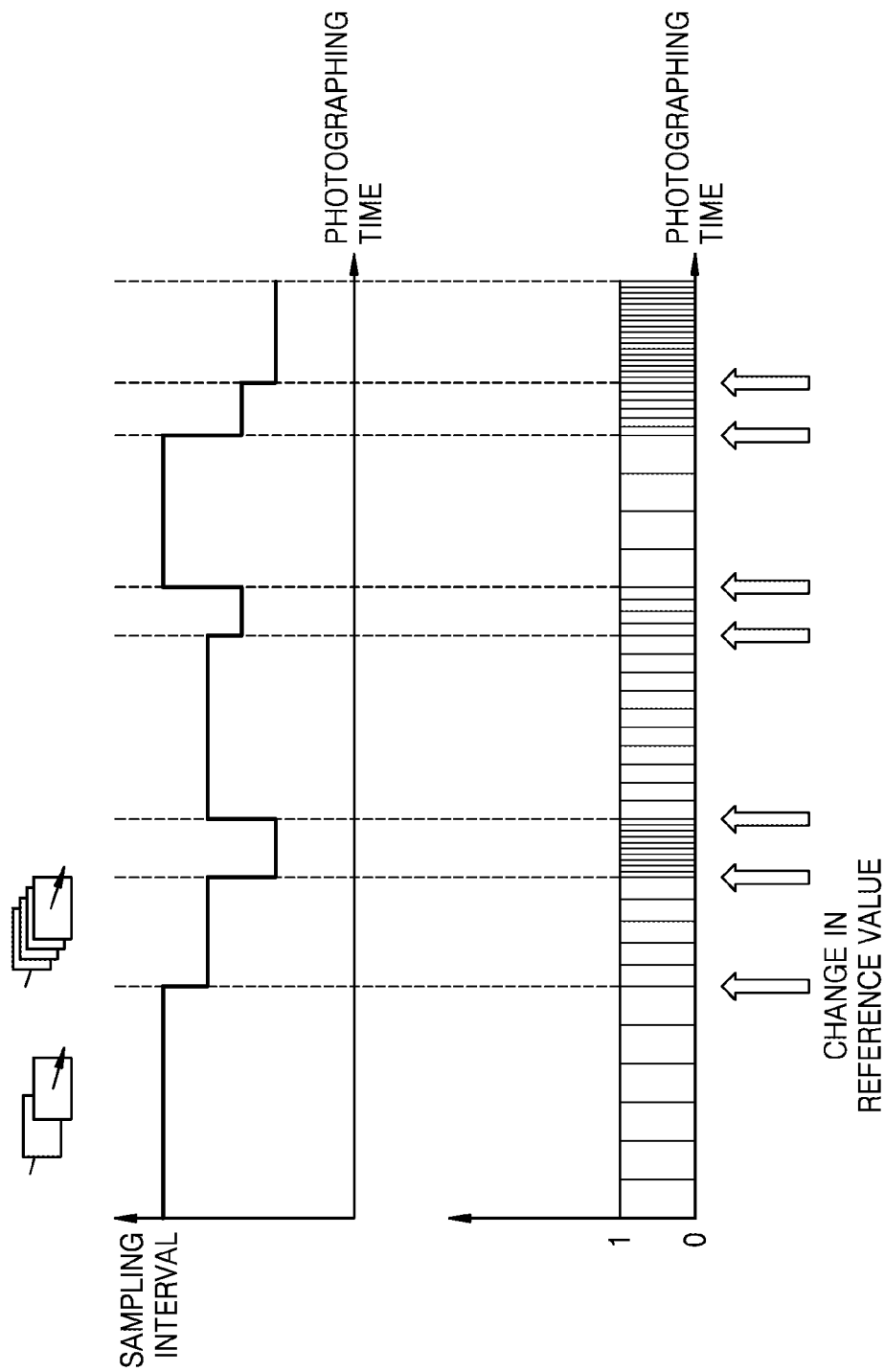
FIG. 2 is a diagram illustrating an example method of generating a time lapse image according to an example embodiment.

FIG. 2 is a diagram illustrating an example method of generating a time lapse image according to an example embodiment.

According to example embodiments of the present disclosure, in order to generate a time lapse image, when time lapse photographing is performed, a frame to be included in the time lapse image is sampled from a plurality of input frames generated from an image signal of an imaging device while a sampling interval is adjusted. As illustrated in FIG. 2, according to example embodiments of the present disclosure, while the photographing is performed, a change in a reference value may be monitored. Thus, a sampling interval of the time lapse photographing may be changed based on the change in the reference value. For example, the sampling interval may be decreased when a moving speed of the photographing apparatus increases, or the sampling interval may be increased when the battery level decreases. For example, the sampling interval may be adjusted by sensing the change in the reference value upon the photographing and immediately reflecting the change in the sampling interval.

The reference value may refer, for example, to a value indicating a photographing environment, a change of a subject, a setting value of a photographing apparatus, and a state of a photographing apparatus, or the like. For example, the reference value may include at least one or a combination of a zooming value, a battery level, movement information of the photographing apparatus, an illumination value, an audio signal, movement information of a subject, presence of face detection, and a face size. The reference value may be acquired from a sensor included in the photographing apparatus, an image signal of the imaging device, setting value information of the photographing apparatus, etc.

In addition, according to example embodiments of the present disclosure, a frame to be selected is sampled while the photographing is performed. The photographing apparatus according to example embodiments of the present disclosure may use a sampling interval determined while the photographing is performed to sample the selected frame while the photographing is performed. Accordingly, it is possible to significantly reduce a required storage space by storing only a selected frame to be included in the time lapse file while the photographing is performed and deleting a discarded frame, compared to a case in which the time lapse image file is generated through post-processing.

Figure 3:
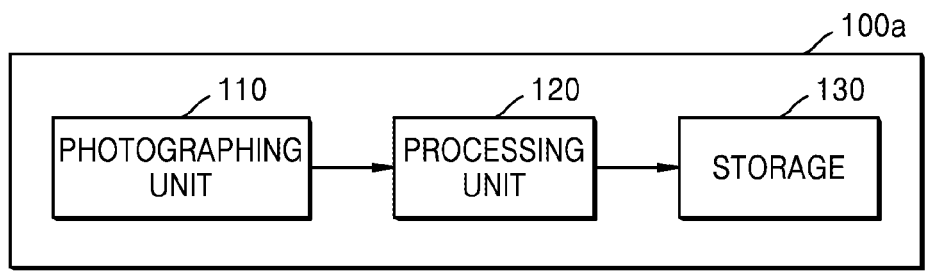
FIG. 3 is a block diagram illustrating an example structure of a photographing apparatus 100a according to an example embodiment.

FIG. 3 is a block diagram illustrating an example structure of a photographing apparatus 100a according to an example embodiment.

The photographing apparatus 100a according to an example embodiment includes a photographing device (e.g., including image capturing circuitry such as, for example, a camera) 110, a processor (e.g., including processing circuitry) 120, and a storage 130.

The photographing apparatus 100a may be implemented in various forms such as a digital camera, a smart phone, a wearable device, a black box, a security camera, a vehicle, a robot, a laptop computer, a table PC, an e-book terminal, a digital broadcasting terminal, a personal digital assistance (PDA), a portable multimedia player (PMP), a navigator, an MP3 player, or the like, but is not limited thereto.

The photographing device 110 may include various circuitry, such as, for example, and without limitation, imaging circuitry, configured to generate an electrical image signal by photoelectric conversion of incident light. The photographing device 110 may be formed integrally with or detachably from the photographing apparatus 100a. The imaging circuitry of the photographing device 110 according to an example embodiment may include, for example, and without limitation, a lens, a lens driver, an aperture, an aperture driver, an imaging device, and an imaging device controller.

The lens may include multiple groups of lenses and multiple sheets of lenses. The position of the lens may be adjusted by the lens driver. The lens driver adjusts the position of the lens according to a control signal provided by the processor 120. For example, the lens driver may receive a zooming control signal from the processor 120 and may perform a zoom-in operation and a zoom-out operation by adjusting the position of the lens. According to an embodiment, the lens driver may drive the lens in order to perform an operation such as focal distance adjustment, hand-shake correction, and wide-angle adjustment.

An opening degree of the aperture may be adjusted by the aperture driver, and thus the aperture adjusts the amount of light incident to the imaging device.

An optical signal transmitted through the lens and the aperture reaches a light receiving surface of the imaging device and forms an image of a subject. The imaging device may include various image sensor circuitry, such as, for example, and without limitation, a complementary metal oxide semiconductor image sensor (CIS) or a charge coupled device (CCD) image sensor, or the like, that converts an optical signal into an electrical signal. The sensitivity of the imaging device may be adjusted by the imaging device controller. The imaging device controller may include various circuitry configured to control the imaging device based on a control signal that may be automatically generated by an image signal being entered in real time or a control signal that is manually input by the user's manipulation.

An exposure time of the imaging device is adjusted by the shutter. The shutter may include, for example, a mechanical shutter that moves the aperture to adjust the incidence of light and an electronic shutter that supplies an electrical signal to the imaging device to control exposure.

The processor 120 samples a selected frame from a plurality of input frames generated by an image signal generated from the photographing device 110 to generate a time lapse image file.

The processor 120 acquires a reference value in real time while the time lapse photographing is performed. As described above, the reference value may include at least one or a combination of a zooming value, a battery level, movement information of the photographing apparatus, an illumination value, an audio signal, movement information of a subject, presence of face detection, and a face size. The processor 120 may acquire the reference value from a sensor included in the photographing apparatus 100a, acquire the reference value by performing image processing on an image signal generated by the photographing device 110, or acquire the reference value with reference to a setting value stored in a memory or the like. The types and number of reference values that are acquired by the processor 120 may be variously determined according to an example embodiment and are not limited to the examples enumerated above.

The processor 120 determines a sampling interval of the time lapse photographing from the selected frame while the time lapse photographing is performed based on a reference value acquired while the time lapse photographing is performed.

The sampling interval may be determined in real time or at a predetermined period based on the reference value. According to an example embodiment, the sampling interval may be determined every frame that is input from the photographing device 110. According to another example embodiment, the sampling interval may be determined every certain number of frames (e.g., every 20 frames) that are input from the photographing device 110.

The types and number of reference values that are basically used when the sampling interval is determined may be variously determined according to an example embodiment. According to an example embodiment, the types and number of reference values that are basically used when the sampling interval is determined may be changed according to an operation mode of the photographing apparatus 100a.

The processor 120 may apply the reference value to a predetermined function to determine the sampling interval. When the processor 120 uses a plurality of reference values to determine the sampling interval, the processor 120 may apply different weights to the plurality of reference values to determine the sampling interval. According to an example embodiment, the weights may be variously determined based on an operation mode of the photographing apparatus 100a.

According to an example embodiment, when the sampling interval is changed, the sampling interval may be gradually changed during a predetermined time period in order to prevent and/or reduce the sampling interval from being rapidly changed.

The processor 120 may selectively sample a selected frame from a plurality of input frames generated from an image signal of the photographing device 110 while the photographing is performed using the sampling interval.

According to an example embodiment, the processor 120 temporarily stores the plurality of input frames in a first storage space that is set in a predetermined buffer or memory. The processor 120 samples the temporarily stored input frames at the predetermined sampling interval to determine the selected frame. The processor 120 may store frames determined as the selected frame in a second storage space that is set in the predetermined buffer or memory. Unselected frames, which are not selected as the selected frame, may not be stored in the second storage space. When the photographing ends, the selected frames stored in the second storage space may be compressed as a video file and stored in the storage 130. The first storage space and the second storage space may each be a main memory or buffer, and may be implemented using a RAM, a flash memory, or the like.

The frames that are temporarily stored in the first storage space are sequentially deleted when the storage space becomes full. According to an example embodiment, in order to temporarily store the frames input from the photographing device 110, only a storage space for storing several tens or hundreds of frames is required. When the time lapse image is generated through post-processing after the photographing ends, all frames that are input while the photographing is performed must be temporarily stored, and thus the storage space required to temporarily store the frames increases significantly.

The storage 130 stores the time lapse image file. The storage 130 may be formed integrally with or detachably from the photographing apparatus 100a. The storage 130 may, for example, be a non-volatile storage medium and may be implemented using a flash memory, a hard disk, a solid state drive (SSD), a secure digital (SD) card, a micro secure digital (Micro-SD) card, an extreme digital (xD) card, a multi-media card (MMC), etc. According to an example embodiment, the storage 130 may also serve as a main memory, a buffer, etc.

Figure 4:
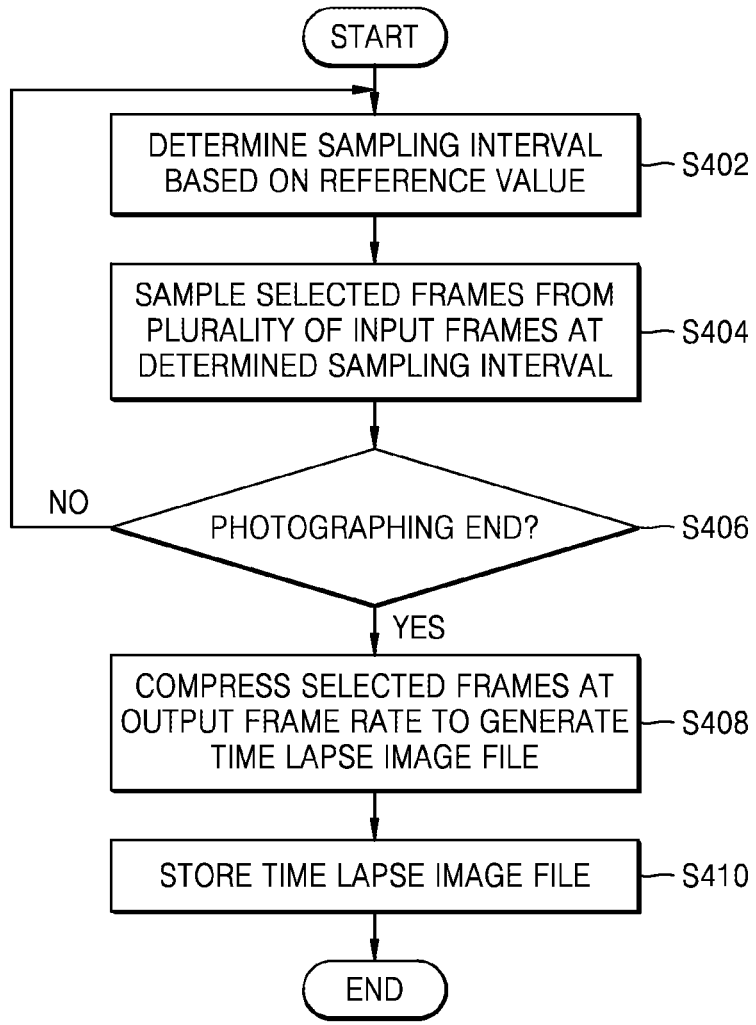
FIG. 4 is a flowchart illustrating an example method of generating a time lapse image according to an example embodiment.

FIG. 4 is a flowchart illustrating an example method of generating a time lapse image according to an example embodiment.

Each step of the method of generating the time lapse image may be performed by an electronic device including a processor comprising processing circuitry (e.g., a CPU, or the like) for processing an image and a storage medium. Example embodiments in which photographing apparatuses 100 that are disclosed in this description (hereinafter, 100 is used as a reference number that is used to collectively refer to the photographing apparatuses disclosed in this description) perform the method of generating the time lapse image will be mainly described herein. The example embodiments in which the photographing apparatus 100 is described may be applied to the method of generating the time lapse image. The example embodiments in which the method of generating the time lapse image is described may be applied to the example embodiments for the photographing apparatus 100. The method of generating the time lapse image according to example embodiments of the present disclosure is not limited to an embodiment in which the photographing apparatus 100 disclosed in this description performs the method, and may be performed by various electronic apparatuses.

The processor 120 determines a sampling interval of time lapse photographing based on a reference value acquired while the time lapse photographing is performed (S402). The sampling interval may change based on a change in the reference value acquired while the photographing is performed.

When the sampling interval is determined, the processor 120 samples selected frames from a plurality of input frames at the determined sampling interval (S404). The sampling interval may be a sampling interval determined for a current frame or a current period.

An operation of determining the sampling interval (S402) and sampling the selected frames (S404) is repeatedly performed until the photographing of the time lapse image ends (S406). The photographing may end, for example, when a user enters a control signal for ending the photographing or when a predetermined condition for ending the photographing is satisfied.

When the time lapse photographing ends, the processor 120 compresses the selected frames at an output frame rate to generate a time lapse image file (S408). The output frame rate may be determined in advance or according to a user input.

The processor 120 stores the generated time lapse image file in the storage 130 (S410).

Figure 5:
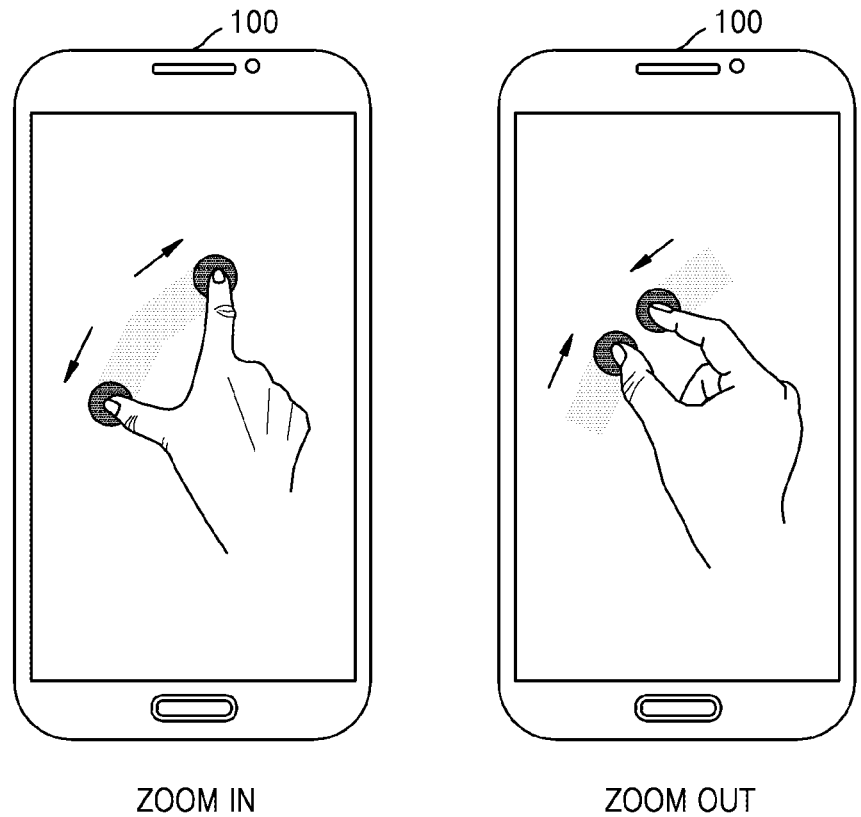
FIG. 5 is a diagram illustrating an example operation of a photographing apparatus 100 according to an example embodiment.

FIG. 5 is a diagram illustrating an example operation of a photographing apparatus 100 according to an example embodiment.

The photographing apparatus 100 according to an example embodiment may perform a zooming operation including a zoom-in operation and a zoom-out operation. Wide-angle photographing or telephoto photographing may be performed using the zooming operation.

According to an example embodiment, as illustrated in FIG. 5, on a condition that the photographing apparatus 100 including a touch screen operates in a photographing mode, a user may perform the zooming operation by making a predetermined gesture while touching the touch screen. For example, as illustrated in FIG. 5, while the user touches two points on the touch screen, the zoom-in operation may be performed by making a gesture of moving the two points away from each other, and the zoom-out operation may be performed by making a gesture of moving the two points toward each other. The user inputs for performing the zoom-in operation and the zoom-out operation may be provided using various input circuitry, such as, for example, and without limitation, a key, wheel, jog, or the like that may be included in the photographing apparatus 100 to control the zoom-in/zoom-out operation.

Figure 6:
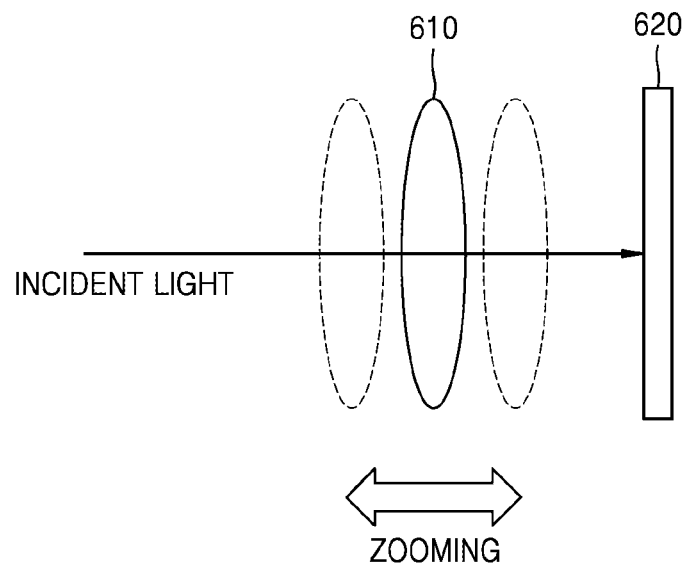
FIG. 6 is a diagram illustrating an example operation of a photographing apparatus 100 according to an example embodiment.

FIG. 6 is a diagram illustrating an example operation of a photographing apparatus 100 according to an example embodiment.

The photographing apparatus 100 performs the zooming operation based on a user input or automatically. The zooming operation may be performed using any one or both of an optical zoom performed by driving a lens and a digital zoom performed by processing an image.

When the optical zoom is performed, as illustrated in FIG. 6, the photographing apparatus 100 may drive a lens 610 to perform the zooming operation. The lens driver may adjust the position of the lens along an optical axis based on a zooming control signal to perform the zooming operation.

When the digital zoom is performed, the processor 120 may be configured to enlarge or reduce an input frame generated from an imaging device 620 or adjust a size of a region of the input frame that is used as frame data to perform the zooming operation.

Figure 7:
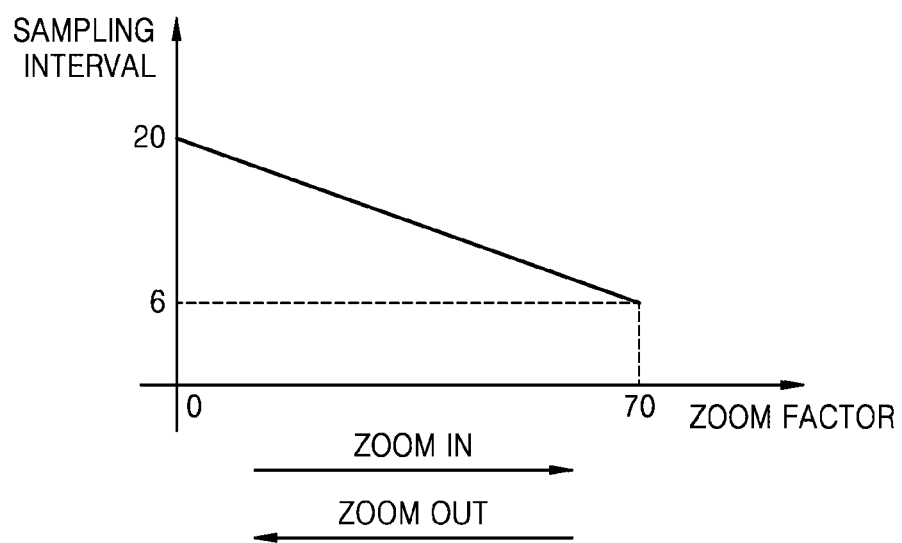
FIG. 7 is a graph illustrating an example in which a sampling interval is adjusted based on a zooming value.

FIG. 7 is a diagram illustrating an example in which a sampling interval is adjusted based on a zooming value.

According to an example embodiment, the sampling interval may be determined based on a zooming value of the photographing apparatus 100. According to an example embodiment, while the time lapse photographing is performed, the sampling interval may decrease when a zoom-in operation is performed, and may increase when a zoom-out operation is performed.

While the time lapse image is photographed, a user may desire to preserve as many significant or interesting frames as possible. Generally, when a user sees a subject of interest while performing the photographing, the user may zoom in on the subject in order to photograph the subject in greater detail. In this example embodiment, it is possible to, for example, preserve frames desired by the user as a time lapse image by decreasing the sampling interval when the zoom-in operation is performed and increasing the sampling interval when the zoom-out operation is performed.

For the digital zoom, the zoom-in occurs when a zoom factor increases, and the zoom-out occurs when the zoom factor decreases. For the digital zoom, the zoom factor may be used as a zooming value. According to some example embodiments, a zoom factor z may be acquired from inside the photographing apparatus 100. A sampling interval s may, for example, be inversely proportional to the zoom factor z. For example, the sampling interval s may be determined as shown in Equation 1 below.

$$s = -0.2 \times z + 20 \qquad \text{[Equation 1]}$$

Equation 1 may map the zoom factor $z \in [0, 70]$ having an integer value from 0 to 70 to the sampling rate $s \in [20, 6]$ having an integer value from 6 to 20. When the zoom factor is 0, there is no digital zoom, or a magnification is 1. When the zoom factor is 70, the digital zoom has a magnification of 8.

For the optical zoom, the focal distance is changed when the zoom operation is performed. The focal distance is acquired in real time while the time lapse photographing is performed. The zoom factor may be determined based on a ratio of a current focal distance and a base focal distance (when a magnification is 1, base focal length). For example, the zoom factor may be determined as shown in Equation 2 below.

$$z = \left(\frac{f}{f_{base}} - 1\right) \times 10 \quad \text{[Equation 2]}$$

Here, f is a focal distance acquired in real time, and $f_{base}$ is a base focal distance when a magnification is 1. After the zoom factor is acquired, Equation 1 may be used to obtain the sampling interval.

Figure 8:
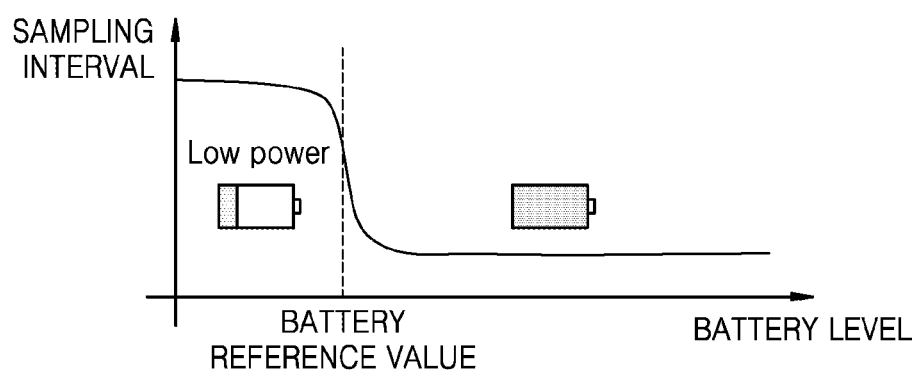
FIG. 8 is a diagram illustrating an example in which a sampling interval is determined based on a battery level.

FIG. 8 is a diagram illustrating an example in which a sampling interval is determined based on a battery level.

The photographing apparatus 100 may include a battery and use the battery as a power source. According to an example embodiment, the processor 120 determines the sampling interval based on a battery level. The battery level may, for example, be a value indicating a battery residual quantity. The battery residual quantity may be high when the battery level is high, and the battery residual quantity may be low when the battery level is low. According to an example embodiment, the processor 120 may increase the sampling interval when the battery level is lower than a battery reference value.

According to an example embodiment, when the battery level is lower than the battery reference value while the time lapse photographing is performed, the photographing apparatus 100 may increase the sampling interval to skip more frames, thus reducing power consumption. According to an example embodiment, the processor 120 may gradually change the sampling interval over a predetermined time in order to prevent and/or reduce the likelihood that the battery level may fall below the battery reference value and thus prevent and/or reduce a sudden change in the sampling interval.

Figure 9:
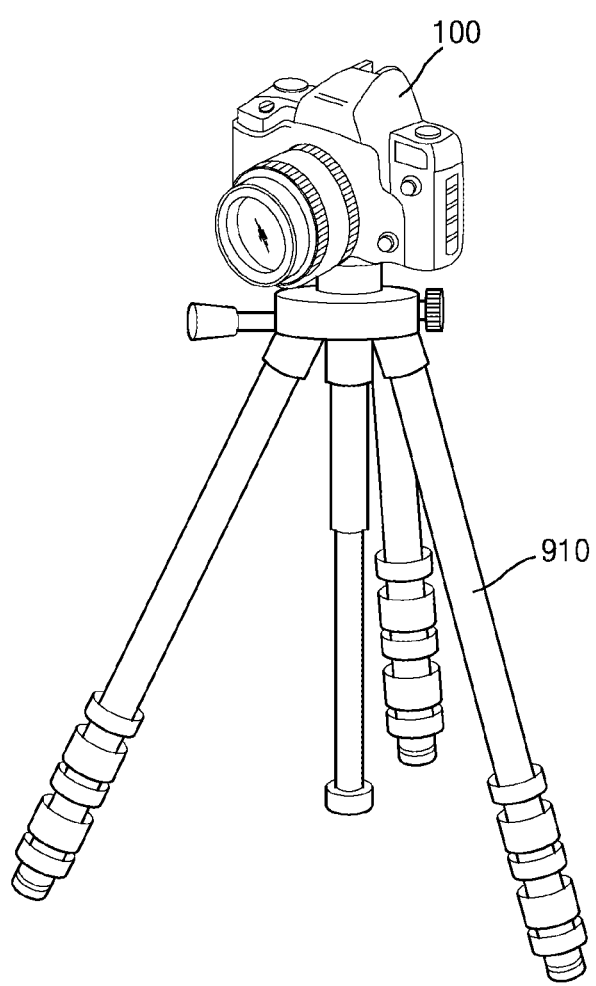
FIG. 9 is a diagram illustrating an example in which a photographing apparatus 100 is fixed on a tripod.

FIG. 9 is a diagram illustrating an example in which a photographing apparatus 100 is fixed on a tripod.

According to an example embodiment, when the photographing apparatus 100 is fixed on a tripod 910 to perform the photographing, the sampling interval decreases when a movement magnitude of a subject increases, and the sampling interval increases when the movement magnitude of the subject decreases. The photographing apparatus 100 may sense that the tripod 910 is connected and may operate in a tripod mode. The connection of the tripod 910 may be detected in various ways such as, for example, and without limitation, the use of a sensor included in a connection part of the photographing apparatus 100 and the sensing of a change in conductivity around the connection part.

Figure 10:
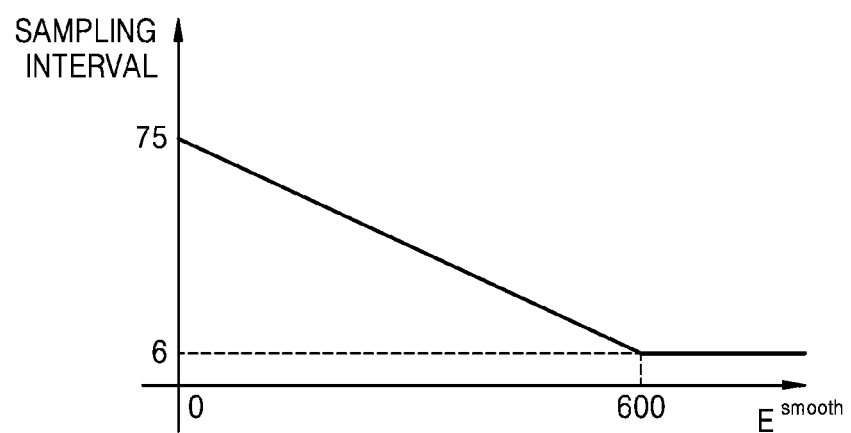
FIG. 10 is a graph illustrating an example relation between a smoothed matching error value $E^{smooth}$ and a sampling interval in a tripod mode according to an example embodiment.

FIG. 10 is a graph illustrating an example relation between a smoothed matching error value $E^{smooth}$ and a sampling interval in a tripod mode according to an example embodiment.

In the tripod mode, the global motion of the photographing apparatus 100 is typically always zero (0). Accordingly, in the tripod mode, the sampling interval may be adjusted on the basis of the movement of a subject. According to an example embodiment, a matching error value E between continuous frames may be used to measure the movement of the subject. The sampling interval s may be inversely proportional to the smoothed matching error value $E^{smooth}$. According to an example embodiment, the sampling interval may be determined as shown in Equation 3 below.

$$s = \begin{cases} -0.116 \times E^{smooth} + 75.6 & E^{smooth} \leq 600 \\ 6 & E^{smooth} > 600 \end{cases} \quad \text{[Equation 3]}$$

Here, $E^{smooth}$ is a smoothed matching error value, which may be acquired by applying, for example, a low band pass filter (e.g., an IIR low band pass filter) to the matching error value E. FIG. 10 illustrates a graph of Equation 3. The matching error value E is a value indicating a difference between frames and, for example, may be determined by a sum of absolute values of pixels of a difference image, a sum of squares of pixel values of a difference image, etc.

According to an example embodiment, the movement of the subject may be considered when the sampling interval is determined in a general mode in addition to the tripod mode. Even in this example, the sampling interval may decrease when the movement magnitude of the subject increases, and the sampling interval may increase when the movement magnitude of the subject decreases.

Figure 11:
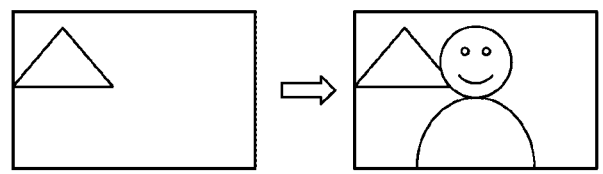
FIG. 11 is a diagram illustrating an example in which a sampling interval is adjusted according to face detection information.
Figure 11:
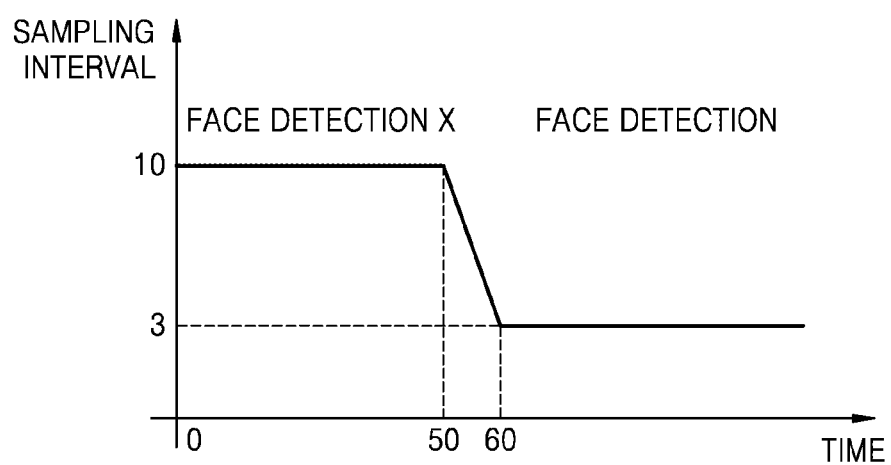

FIG. 11 is a diagram illustrating an example in which a sampling interval is adjusted based on face detection information.

According to an example embodiment, the sampling interval may be adjusted depending on whether a face is detected from the plurality of input frames. In a video, a face of a person may be a target of interest of a user. When a face occupies a large portion of an input frame, there is a high possibility that this is an important scene. According to example embodiments of the present disclosure, the sampling interval may be changed based on whether there is a face in the input frame. The sampling interval may decrease when a face appears in the input frame, and may increase when the face disappears or is no longer in the frame.

The processor 120 may determine the presence of the face from a face detection result of each frame. The processor 120 may use various types of face detection algorithms to detect the face from the input frame.

When the face suddenly appears or disappears, the sampling interval may gradually change during a predetermined time period in order to prevent and/or avoid a sudden change in the sampling interval. For example, when the face appears or disappears, the sampling interval may change for 10 seconds.

According to an example embodiment, as illustrated in FIG. 11, when a face that was not detected is detected from the input frame, the sampling interval may decrease. Also, according to an example embodiment, when a face of person 1 was detected from the input frame, but a face of person 2 is newly detected from the input frame, the sampling interval may decrease. Also, according to an example embodiment, when a pre-registered face that was not detected is newly detected from the input frame, the sampling interval may decrease. The preregistered face may, for example, be registered in advance by a user.

Figure 12:
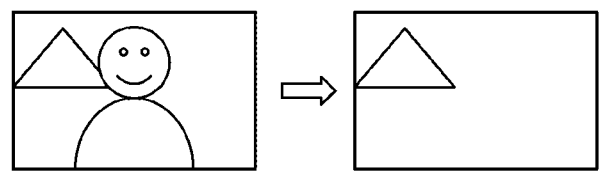
FIG. 12 is a diagram illustrating an example in which a sampling interval is adjusted according to face detection information.
Figure 12:
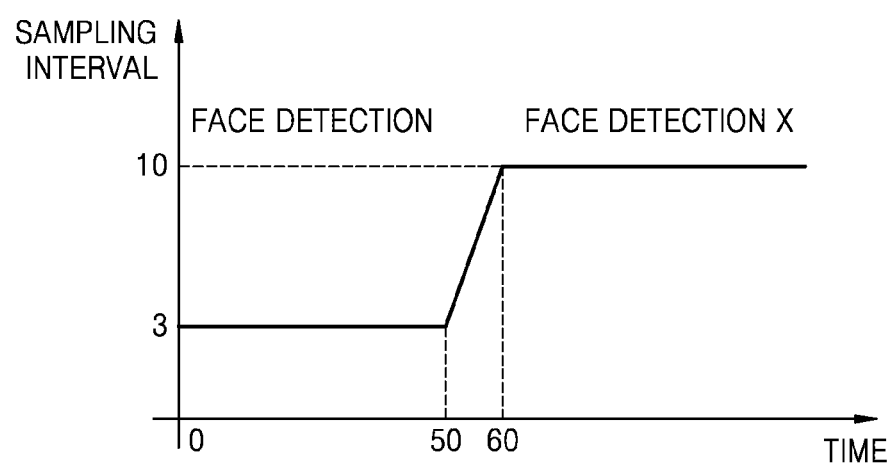

FIG. 12 is a diagram illustrating an example in which a sampling interval is adjusted based on face detection information.

According to an example embodiment, as illustrated in FIG. 12, when a face that was detected is no longer detected from the input frame, the sampling interval may increase. According to an example embodiment, when a face of person 1 and a face of person 2 were detected from the input frame, but the face of person 1 is no longer detected and only the face of person 2 is still detected, the sampling interval may increase. According to an example embodiment, when a pre-registered face that was detected is no longer detected from the input frame, the sampling interval may increase.

Figure 13:
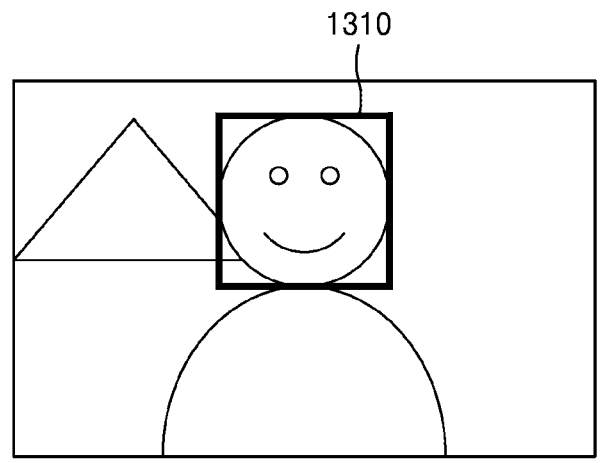
FIG. 13 is a diagram illustrating an example configuration in which a sampling interval is adjusted according to a face size according to an example embodiment.

FIG. 13 is a diagram illustrating an example configuration in which a sampling interval is adjusted depending on a face size according to an example embodiment.

According to an example embodiment, the sampling interval may be adjusted based on the face size. According to an example embodiment, the sampling interval may decrease when the detected face size increases, and the sampling interval may increase when the detected face size decreases.

The processor 120 may detect a face from input frames. For example, as illustrated in FIG. 13, the processor 120 may detect, for example, a quadrilateral face region box 1310. The face size may be determined by at least one or a combination of a width and an area of the face region box 1310.

Figure 14:
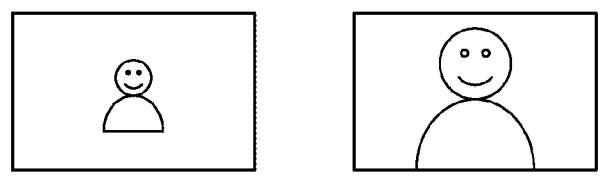
FIG. 14 is a graph illustrating an example relation between a face size and a sampling interval according to an example embodiment.
Figure 14:
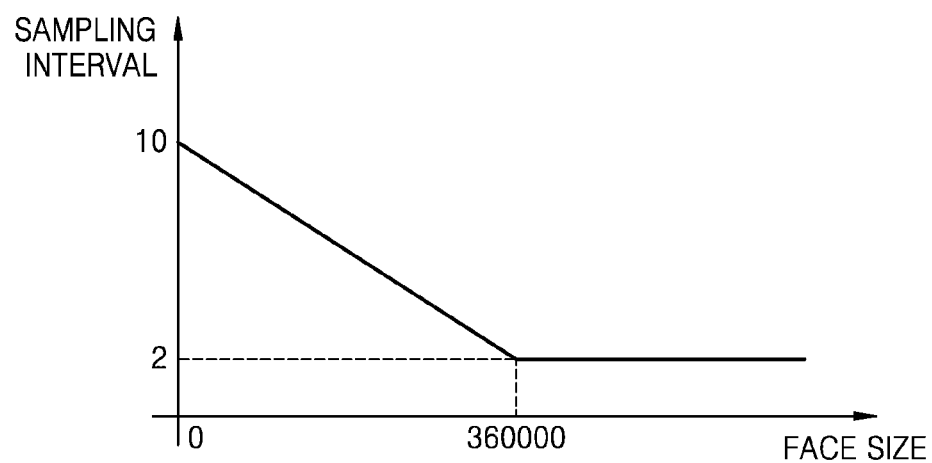

FIG. 14 is a graph illustrating an example relation between a face size and a sampling interval according to an example embodiment.

According to an example embodiment, the face size may be determined by an area of the face region box 1310, for example, the product of the width and the area of the face region box 1310. The sampling interval may be determined in inverse proportion to the face size and, for example, may be determined as shown in Equation 4 below.

$$s = \begin{cases} -0.000022 \times w + 10 & w \leq 360000 \\ 2 & w > 360000 \end{cases} \quad \text{[Equation 4]}$$

Here, s is a sampling interval, and w is a face region area (in pixel$^2$). FIG. 14 illustrates a relation between the face size and the sampling interval determined by Equation 4. The face size corresponds to the face region area w.

According to an example embodiment, when a face of a user is detected before the start of the time lapse photographing, the user may enter or select the face in order to decrease the sampling interval. The processor 120 may provide a user interface that allows the user to enter or select the face. For example, when a baby is photographed as a time lapse image, the user may photograph and then enter the baby's face or select the baby's face from among prestored faces as a face preregistered before the user starts to photograph the time lapse image. Thus, when the baby's face is detected, the sampling interval may be decreased.

Figure 15:
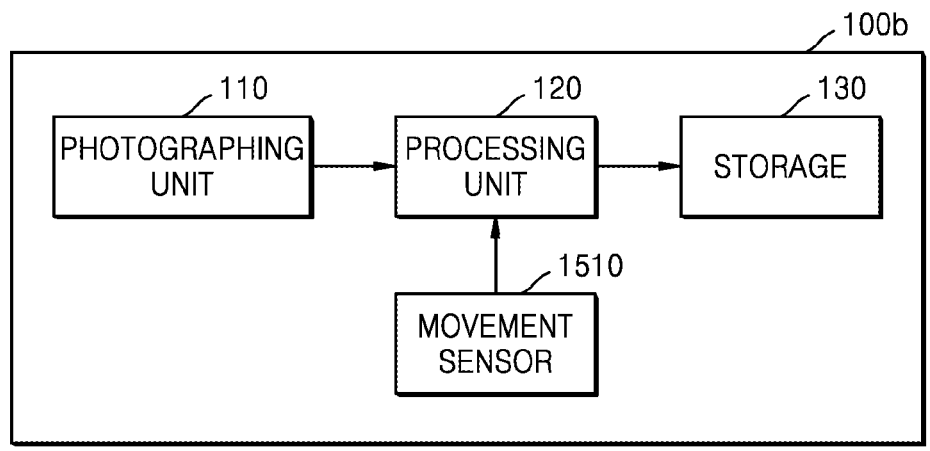
FIG. 15 is a block diagram illustrating an example structure of a photographing apparatus 100b according to an example embodiment.

FIG. 15 is a block diagram illustrating an example structure of a photographing apparatus 100b according to an example embodiment.

The photographing apparatus 100b according to an example embodiment includes a photographing device (e.g., including imaging circuitry, e.g., a camera) 110, a processor (e.g., including processing circuitry) 120, a storage 130, and a movement sensor 1510.

The photographing device 110 may include various imaging circuitry that generates an electrical image signal by photoelectric conversion of incident light. The photographing device 110 may be formed integrally with or detachably from the photographing apparatus 100b. The photographing device 110 according to an example embodiment includes a lens, a lens driver, an aperture, an aperture driver, an imaging device, and an imaging device controller.

The processor 120 may include various processing circuitry, e.g., a CPU, that samples selected frames from a plurality of input frames generated by an image signal generated from the photographing device 110 to generate a time lapse image file from the selected frames.

The processor 120 acquires a reference value in real time while the time lapse photographing is performed. The processor 120 according to an example embodiment determines a sampling interval based on movement information of the photographing apparatus 110b acquired from the movement sensor 1510 while the time lapse photographing is performed. The sampling interval may decrease when the movement magnitude of the photographing apparatus 100b increases, and the sampling interval may increase as the movement of the photographing apparatus 100b decreases.

According to an example embodiment, in a tripod mode, the photographing apparatus 100b may not consider the movement of the photographing apparatus 100b when the sampling interval is determined.

The processor 120 may selectively sample a selected frame from a plurality of input frames generated from an image signal of the photographing device 110 while the photographing is performed using the sampling interval.

The storage 130 stores the time lapse image file. The storage 130 may be formed integrally with or detachably from the photographing apparatus 100b.

The movement sensor 1510 may include various movement detection circuitry that detects the movement of the photographing apparatus 100b. The movement sensor 1510 may detect a movement direction and a size of the photographing apparatus 100b. The movement sensor 1510 may be implemented using various movement detection circuitry, such as, for example, and without limitation, an acceleration sensor, a gyro sensor, etc.

The time lapse photographing generates a compressed output such that a user may easily skim over videos within a short time. Since it is difficult to recognize content from a shaking video, time lapse photographing should avoid the shaking of the output. Thus, a video stabilization process may be performed after the time lapse.

In addition to post-processing technology such as video stabilization, an effective method of stabilizing content includes, for example, adjusting the sampling interval in the time lapse. The sampling interval decreases as the movement magnitude of the photographing apparatus increases, and the sampling interval increases as the movement of the photographing apparatus decreases. In order to adjust the sampling interval based on the movement of the photographing apparatus 100b, the processor 120 may determine a smoothed version having the same magnitude as the frame global motion in real time and may adjust the sampling interval. A global translation or rotation component with respect to an x-axis is referred to as MVx, a global translation or rotation component with respect to a y-axis is referred to as Mvy, and a rotation operation with respect to a z-axis is referred to as MVz. The smoothed movement magnitude $MV_{magnitude}^{smooth}$ may be determined as shown in Equation 5 below.

$$MV_{magnitude}^{smooth} = \sqrt[2]{a \times (ave(abs(MV_x)))^2 + b \times (ave(abs(MV_y)))^2 + c \times (ave(abs(MV_z)))^2} \quad \text{[Equation 5]}$$

The function abs (variable) represents an absolute value process. The function abs (variable) may represent a smoothing process, and according to an embodiment, may be acquired using a low band pass filter (e.g., an IIR low band pass filter). Constants a, b, and c represent weight constants. For example, the sampling interval may be a piecewise function having the same size as the smoothed movement magnitude. The translation component may be represented as a pixel value.

The constants a, b, and c may be set differently depending on movement components of the photographing apparatus 100b. When the translation component of the movement of the photographing apparatus 100b is equal to or less than a predetermined reference value, the constants a, b, and c may be set to assign a large weight to the rotation component. When the translation component of the movement of the photographing apparatus 100b is greater than a predetermined reference value, the constants a, b, and c may be set such that a large weight is assigned to the translation component. When the translation component is greater than a predetermined reference value, a weight of the constant c to a z-axis component that is in an optical axis direction may decrease, and a weight of the constant a to an x-axis component that is in a horizontal direction may increase.

Figure 16:
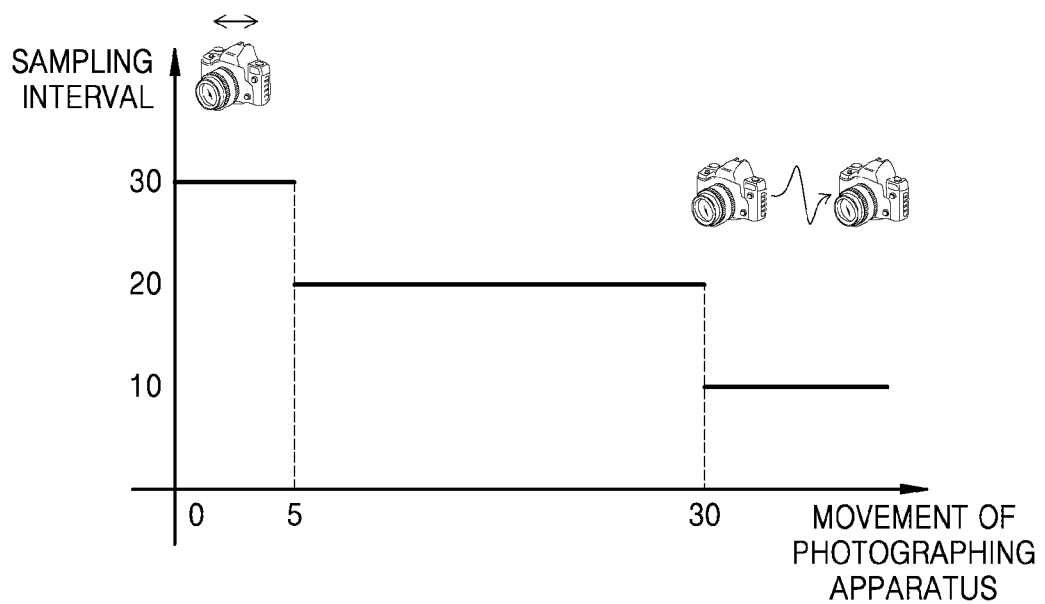
FIG. 16 is a graph illustrating an example relation between movement of a photographing apparatus and a sampling interval according to an example embodiment.

FIG. 16 is a graph illustrating an example relation between movement of a photographing apparatus and a sampling interval according to an example embodiment.

According to an example embodiment, the sampling interval may be determined as shown in Equation 6 below.

$$s = \begin{cases} 30 & MV_{magnitude}^{smooth} \leq 5 \\ 20 & 5 < MV_{magnitude}^{smooth} < 30 \\ 10 & MV_{magnitude}^{smooth} \geq 30 \end{cases} \quad \text{[Equation 6]}$$

FIG. 16 is a graph illustrating an example relation between movement of a photographing apparatus and a sampling interval according to Equation 6. The movement of the photographing apparatus may be represented as $MV_{magnitude}^{smooth}$.

Figure 17:
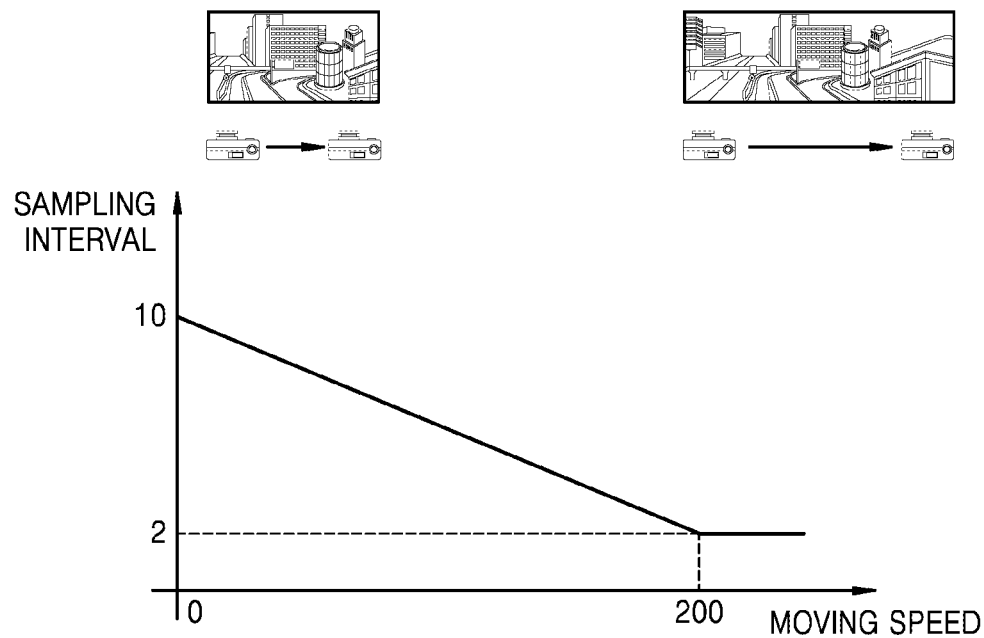
FIG. 17 is a graph illustrating an example relation between a moving speed of a photographing apparatus 100b and a sampling interval according to an example embodiment.

FIG. 17 is a graph illustrating an example relation between a moving speed of a photographing apparatus 100b and a sampling interval according to an example embodiment.

According to an example embodiment, the sampling interval may be determined based on a moving speed of the photographing apparatus 100b. The sampling interval may decrease when the moving speed of the photographing apparatus 100b increases, and the sampling interval may increase when the moving speed of the photographing apparatus 100b decreases.

In a panning scenario in which the photographing apparatus 100b moves in one direction for a certain time, in order to easily recognize a time lapse image, a sampling interval in the panning scenario may be set to be lower than that in another scenario. In addition, the sampling interval may be adaptively changed on the basis of a moving speed of the photographing apparatus 100b in the panning scenario. As illustrated in FIG. 17, the sampling interval may decrease as the moving speed of the photographing apparatus 100b increases, and the sampling interval may increase when the moving speed of the photographing apparatus 100b decreases. The photographing apparatus 100b may operate in the panning mode by a user setting, may operate in the panning mode on the basis of movement information detected by the movement sensor 1510, or may operate in the panning mode on the basis of an image signal from the photographing device 110.

According to an example embodiment, a motion vector may be acquired through matching that is based on an image signal generated by the photographing device 110 or may be acquired from the movement sensor 1510. The movement magnitude of the photographing apparatus 100b may be determined as shown in Equation 7 below.

$$MV_{magnitude} = \sqrt[2]{a \times MV_x^2 + b \times MV_y^2 + c \times MV_z^2} \quad \text{[Equation 7]}$$

Here, a, b, and c are weight constants. The sampling interval may be inversely proportional to a magnitude of the motion vector, and may be determined as a piecewise function like Equation 8 below.

$$s = \begin{cases} -0.04 \times MV_{magnitude} + 10 & MV_{magnitude} \leq 200 \\ 2 & MV_{magnitude} > 200 \end{cases} \quad \text{[Equation 8]}$$

A function according to Equation 8 matches a movement magnitude $MV_{magnitude}$ to a sampling interval $s \in [10, 2]$ that is an integer ranging from 2 to 10. The graph of FIG. 17 illustrates an example relation between a sampling interval and a moving speed according to Equation 8. The moving speed may be expressed as a movement magnitude $MV_{magnitude}$.

Figure 18:
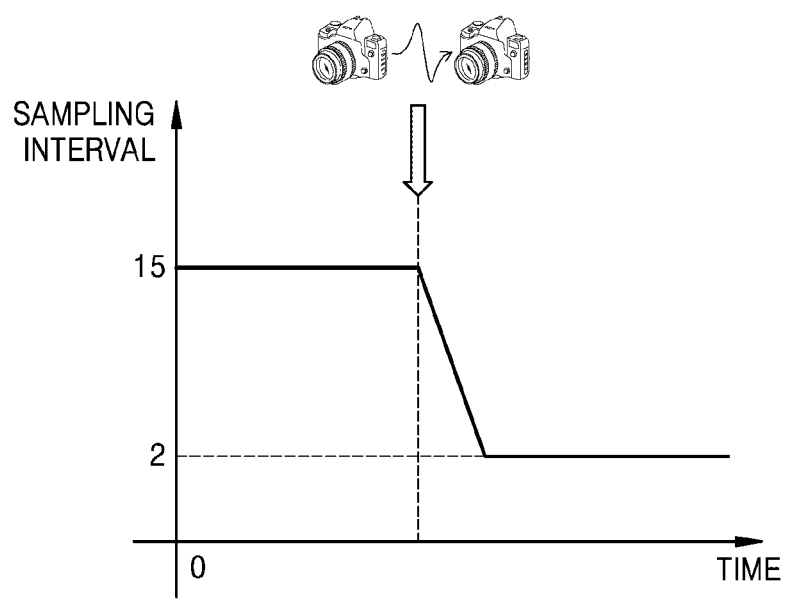
FIG. 18 is a diagram illustrating an example change in a sampling interval when a sudden movement is detected from a photographing apparatus 100b according to an example embodiment.

FIG. 18 is a diagram illustrating an example change in a sampling interval when a sudden movement is detected from a photographing apparatus 100b according to an example embodiment.

According to an example embodiment, when a sudden movement is detected by the photographing apparatus 100b, the sampling interval decreases. The sudden movement may be detected by determining whether the movement of the photographing apparatus 100b per unit time, for example, the moving speed of the photographing apparatus 100b is equal to or greater than a predetermined reference value.

When an unexpected situation occurs during the photographing, the movement of the photographing apparatus 100b may suddenly increase. For example, the unexpected situation includes an example in which a user slips or falls during the photographing. According to an example embodiment, when a movement of the photographing apparatus 100b that is abnormally large is detected, the sampling interval decreases, and more frames are preserved in a time lapse image file. For example, as illustrated in FIG. 18, when a sudden movement is detected, the sampling interval decreases from 15 to 2. The movement of the photographing apparatus 100b may be detected from a detection value of the movement sensor 1510 or may, for example, be acquired by performing a video motion estimation process on the input frames.

Figure 19:
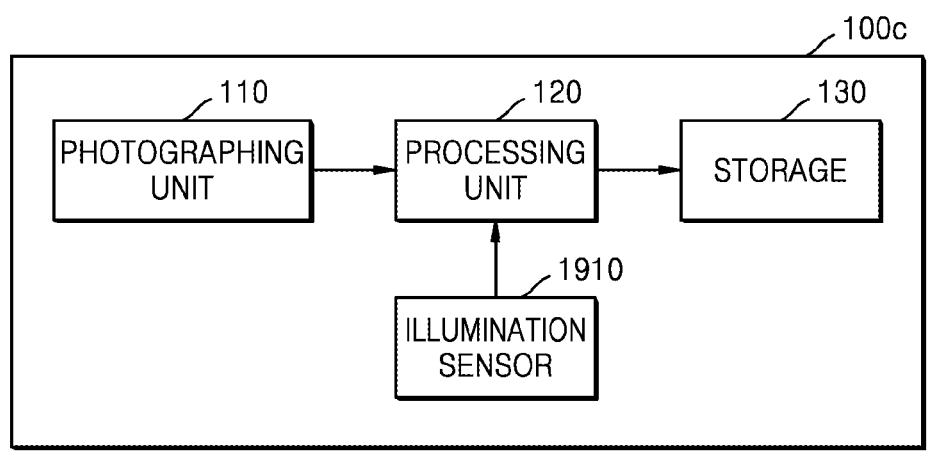
FIG. 19 is a block diagram illustrating an example structure of a photographing apparatus 100c according to an example embodiment.

FIG. 19 is a block diagram illustrating an example structure of a photographing apparatus 100c according to an example embodiment.

The photographing apparatus 100c according to an example embodiment includes a photographing device (e.g., including imaging circuitry, for example, a camera) 110, a processor (e.g., including processing circuitry) 120, a storage 130, and an illumination sensor 1910.

The photographing device 110 includes processing circuitry that generates an electrical image signal by photoelectric conversion of incident light. The photographing device 110 may be formed integrally with or detachably from the photographing apparatus 100c. The photographing device 110 according to an example embodiment includes various imaging circuitry, such as, for example, and without limitation, a lens, a lens driver, an aperture, an aperture driver, an imaging device, and an imaging device controller.

The processor 120 samples selected frames from a plurality of input frames generated by an image signal generated from the photographing device 110 to generate a time lapse image file from the selected frames.

The processor 120 acquires a reference value in real time while the time lapse photographing is performed. The processor 120 according to an example embodiment determines a sampling interval based on an illumination value acquired from the illumination sensor 1910 while the time lapse photographing is performed. The sampling interval may be greater when the illumination value is less than a low-illumination reference value or when the illumination value is greater than a high-illumination reference value than the sampling interval when the illumination value is equal to or greater than the low-illumination reference value and equal to or less than the high-illumination reference value.

The processor 120 may selectively sample selected frames from a plurality of input frames generated from an image signal of the photographing device 110 while the photographing is performed using the sampling interval. Also, the processor 120 may compress the selected frames to generate a time lapse image file.

The storage 130 stores the time lapse image file. The storage 130 may be formed integrally with or detachably from the photographing apparatus 100*b*.

The illumination sensor 1910 measures the brightness outside the photographing apparatus 100*c*. The illumination sensor 1910 may be implemented using various illumination sensing circuitry, such as, for example, and without limitation, a photosensitive device, a photoelectric cell, a photoelectric tube, etc.

When an ambient brightness, that is, an illumination is too high or low while the time lapse image is photographed, it is difficult to recognize content from an input frame. According to an example embodiment, when the illumination is too high or low, the sampling interval increases to skip meaningless input frames. When the ambient brightness is greater than the high-illumination reference value, the photographing apparatus 100*c* according to an example embodiment increases the sampling interval. In addition, when the ambient brightness is less than the low-illumination reference value, the photographing apparatus 100*c* according to an example embodiment increases the sampling interval.

Figure 20:
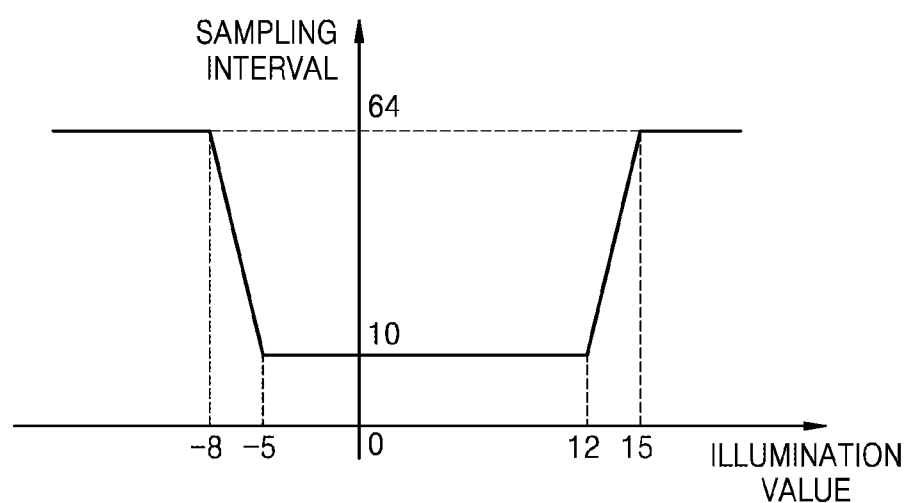
FIG. 20 is a graph illustrating an example relation between an illumination value and a sampling interval according to an example embodiment.

FIG. 20 is a graph illustrating an example relation between an illumination value and a sampling interval according to an example embodiment.

According to an example embodiment, the sampling interval and the ambient brightness value may be determined by a piecewise function, as shown in Equation 9 below.

$$s = \begin{cases} 64 & v < -8 \\ -18 \times v - 80 & -8 \leq v \leq -5 \\ 10 & -5 < v < 12 \\ 18 \times v - 206 & 12 \leq v \leq 15 \\ 64 & v > 15 \end{cases} \quad \text{[Equation 9]}$$

Here, s is a sampling interval, and v is an ambient brightness value. The ambient brightness value may be determined by an illumination value. In Equation 9, the low-illumination reference value is set as −8, and the high-illumination reference value is set as 15. According to another example embodiment, when the ambient brightness value v is less than the low-illumination value or greater than the high-illumination value, the processor 120 may not perform sampling. The graph of FIG. 20 illustrates an example relation between a sampling interval and an illumination value according to Equation 9.

Figure 21:
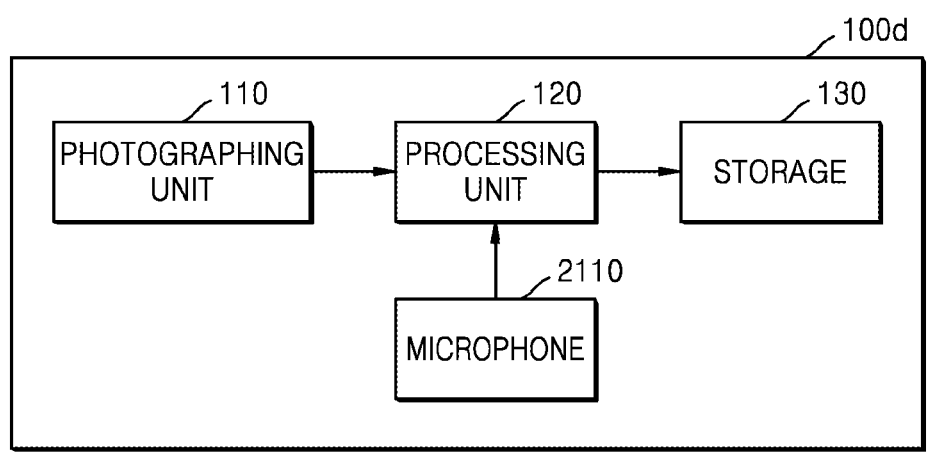
FIG. 21 is a block diagram illustrating an example structure of a photographing apparatus 100d according to an example embodiment.

FIG. 21 is a block diagram illustrating an example structure of a photographing apparatus 100*d* according to an example embodiment.

The photographing apparatus 100*d* according to an embodiment includes a photographing device (e.g., including imaging circuitry, such as, for example, a camera) 110, a processor (e.g., including processing circuitry) 120, a storage 130, and a microphone 2110.

The photographing device 110 includes various imaging circuitry that generates an electrical image signal by photoelectric conversion of incident light. The photographing device 110 may be formed integrally with or detachably from the photographing apparatus 100*d*. The photographing device 110 according to an example embodiment includes various imaging circuitry, such as, for example, and without limitation, a lens, a lens driver, an aperture, an aperture driver, an imaging device, and an imaging device controller.

The processor 120 samples selected frames from a plurality of input frames generated by an image signal generated from the photographing device 110 to generate a time lapse image file from the selected frames.

The processor 120 acquires a reference value in real time while the time lapse photographing is performed. The processor 120 according to an example embodiment determines a sampling interval based on an audio signal acquired from the microphone 2110 while the time lapse photographing is performed. The processor 120 may decrease the sampling interval when a predefined sound or word is detected from the audio signal.

The predefined sound may include, for example, a laughing sound, a cheering sound, a screaming sound, a crying sound, etc. The predefined word may include, for example, a person's name, mommy, daddy, baby, run, start, photographing, recording, etc.

The processor 120 may selectively sample selected frames from a plurality of input frames generated from an image signal of the photographing device 110 while the photographing is performed using the sampling interval. Also, the processor 120 may compress the selected frames to generate a time lapse image file.

The storage 130 stores the time lapse image file. The storage 130 may be formed integrally with or detachably from the photographing apparatus 100*b*.

The microphone 2110 may include a vibration plate to detect an audio signal.

When an emergency situation (e.g., flood, earthquake, etc.), an interesting instance (e.g., goal or score during a sports game), an important instance (e.g., a memorable instance, a birthday, etc.), or the like occurs during the photographing, a photographer or a subject may shout with joy, scream, cry, clap, cheer, or say a specific word or name. The photographing apparatus 100*d* according to an example embodiment may pre-register a specific sound or word. When the photographing apparatus 100*d* detects the pre-registered sound or word using the microphone 2110, the photographing apparatus 100*d* decreases the sampling interval. According to an example embodiment, more meaningful frames may be preserved in the time lapse image file by such a configuration.

According to an example embodiment, the processor 120 may check whether a sound clip output from the microphone 2110 of the photographing apparatus 100d matches the pre-registered sound or word by performing comparison with an original digital signal or characteristics extracted from an original signal acquired from the microphone 2110. The comparison of the pre-registered sound or word with the original digital signal or characteristics may be performed, for example, by short-term Fourier transform or wavelet transform. When a matching error is smaller than a reference value, the processor 120 may decrease the sampling interval.

According to an example embodiment, when a predetermined time passes after the pre-registered sound or word is detected from the audio signal, the processor 120 may increase the sampling interval again. For example, when the pre-registered sound or word is not detected again for 10 seconds after a clapping sound, which is a pre-registered sound, is detected, the sampling interval may increase again.

Figure 22:
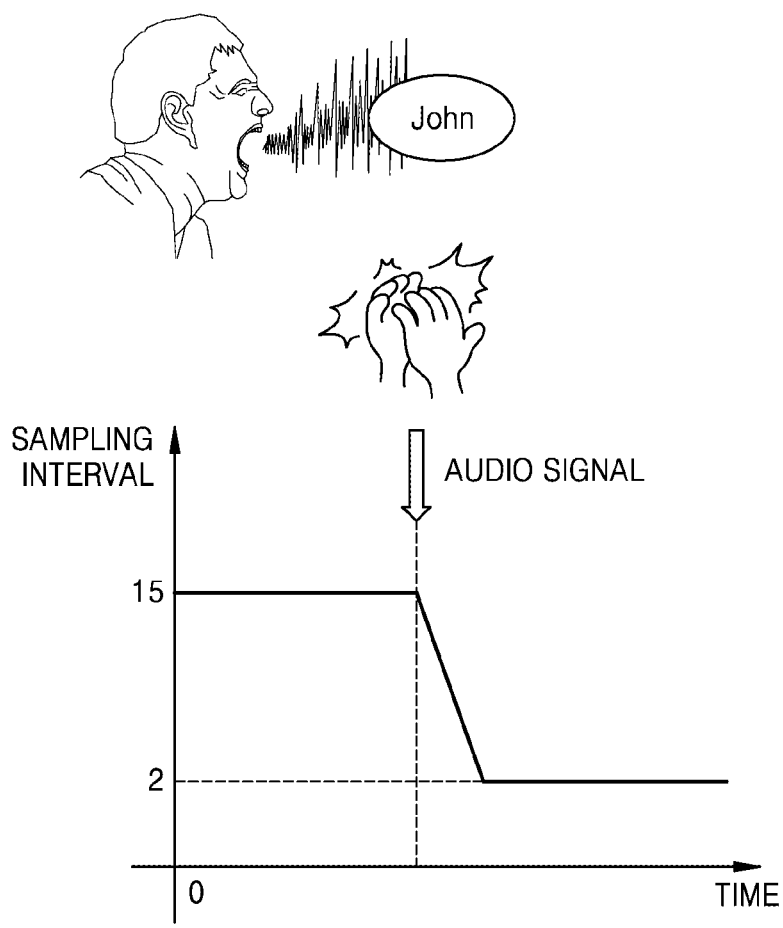
FIG. 22 is a diagram illustrating an example in which a sampling interval is adjusted on the basis of an audio signal according to an example embodiment.

FIG. 22 is a diagram illustrating an example in which a sampling interval is adjusted on the basis of an audio signal according to an example embodiment.

According to an example embodiment, when a pre-registered word, e.g., "John" is detected from an audio signal or when a clapping sound, which may be a pre-registered sound, is detected from the audio signal, the sampling interval may decrease as illustrated in FIG. 22. The sampling interval may gradually decrease during a predetermined time period for which the pre-registered sound or word is detected from the audio signal.

According to an example embodiment, when the word is detected from the audio signal while the time lapse photographing is performed, the processor 120 may provide a user interface that allows a user to enter a word for decreasing the sampling interval. The user may use the user interface to enter a desired word to the photographing apparatus 100d as text or an audio signal. The processor 120 may recognize the word from the audio signal entered by the user using various voice recognition algorithms.

According to an example embodiment, when the sound is detected from the audio signal while the time lapse photographing is performed, the processor 120 may provide a user interface that allows a user to enter a sound for decreasing the sampling interval. The user may use the user interface to enter a desired sound to the photographing apparatus 100d as an audio signal.

According to an example embodiment, various sound samples may be stored in the storage 130. When the sound is detected from the audio signal while the time lapse photographing is performed, the user may select the sound for decreasing the sampling interval from among the sound samples. In addition, according to an example embodiment, when the sound is detected from the audio signal while the time lapse photographing is performed according to an operation mode, the processor 120 may automatically select the sound for decreasing the sampling interval from among the sound samples. For example, in a landscape mode, the processor 120 may determine a sound of wave or a sound of an animal as the sound for decreasing the sampling interval.

According to an example embodiment, before the start of the time lapse photographing, the user may enter or select a word or sound for decreasing the sampling interval when the corresponding word is detected. The processor 120 may provide a user interface that allows the user to enter or select a word or sound. For example, when a sports game is photographed as a time lapse image, the user may select a cheering sound and a clapping sound as the pre-registered word or sound in advance before starting to photograph the time lapse image. When the cheering sound and the clapping sound are detected, the processor 120 may decrease the sampling interval.

Figure 23:
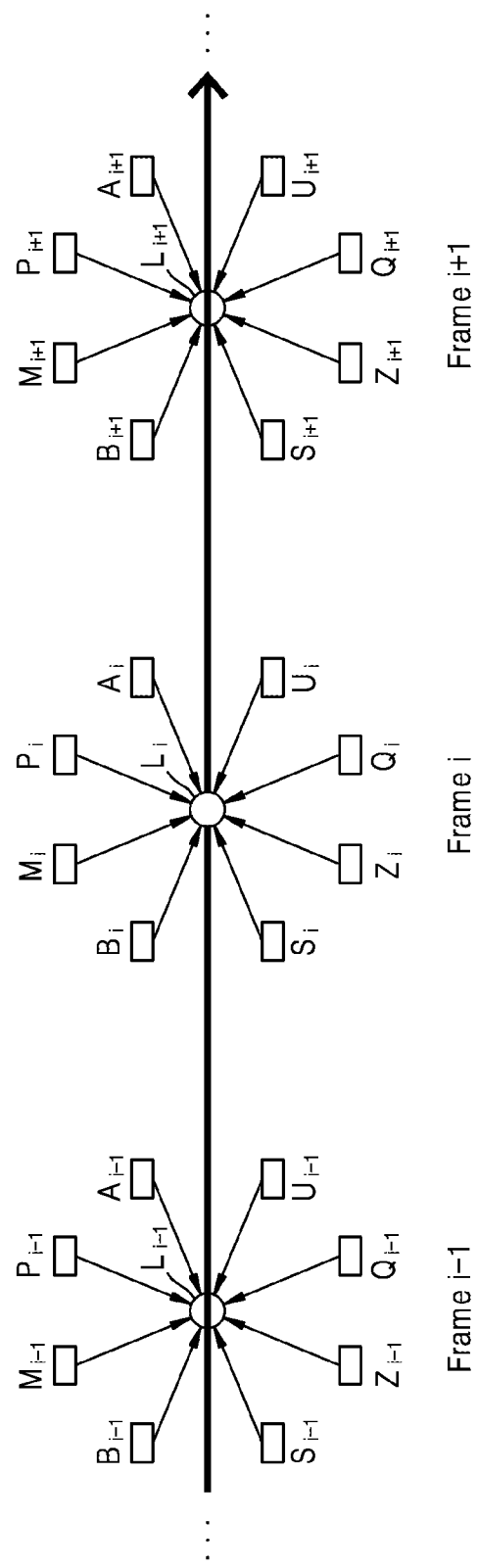
FIG. 23 is a diagram illustrating an example scheme in which a sampling interval is set according to an example embodiment.

FIG. 23 is a diagram illustrating an example scheme in which a sampling interval is set according to an example embodiment.

According to an example embodiment, a reference value may have a plurality of parameters. Intermediate calculation values may be determined with the plurality of parameters, and a final sampling interval may be determined by assigning the intermediate calculation values to a predetermined function. For example, as illustrated in FIG. 23, for $Frame_{i-1}$, which is an (i−1)th input frame, a final sampling interval $L_{i-1}$ may be determined using a movement magnitude $M_{i-1}$ of a photographing apparatus, a moving speed $P_{i-1}$ of a photographing apparatus in a panning mode, a window size $A_{i-1}$ for a video stabilization process, an ambient brightness value $U_{i-1}$, an audio signal $Q_{i-1}$, a zooming value $Z_{i-1}$, a face size $S_{i-1}$, and a battery level $B_{i-1}$. In addition, for $Frame_i$, which is an ith input frame, a final sampling interval $L_i$ may be determined using a movement magnitude $M_i$ of a photographing apparatus, a moving speed $P_i$ of a photographing apparatus in a panning mode, a window size $A_i$ for a video stabilization process, an ambient brightness value $U_i$, an audio signal $Q_i$, a zooming value $Z_i$, a face size $S_i$, and a battery level $B_i$. In addition, for $Frame_{i+1}$, which is an (i+1)th input frame, similarly, a final sampling interval $L_{i+1}$ may be determined.

According to an example embodiment, the types of parameters used to determine the final sampling interval $L_i$ may be changed. For example, according to an example embodiment, the final sampling interval $L_i$ may be determined using an illumination value, a movement magnitude of a photographing apparatus, and the presence of face detection. According to another example embodiment, the final sampling interval $L_i$ may be determined using a movement of a subject, a battery level, and an audio signal.

In addition, according to an example embodiment, the frame interval used to determine the final sampling interval $L_i$ may be changed. For example, according to an embodiment, $L_i$ may be determined every frame. According to another example embodiment, $L_i$ may be determined every 10 frames.

According to an example embodiment, the final sampling interval $L_i$ may be determined using a cost function such as Equation 10. The final sampling interval $L_i$ is determined such that the cost function has a minimum value.

$$C(L) = \sum_{i=1}^{N} \{m \times (L_i - f^M(M_i))^2 + p \times (L_i - f^P(P_i))^2 + a \times (L_i - f^A(A_i))^2 + u \times (L_i - f^U(U_i))^2 + q \times (L_i - f^Q(Q_i))^2 + z \times (L_i - f^Z(Z_i))^2 + s \times (L_i - f^S(S_i))^2 + b \times (L_i - f^B(B_i))^2 + c \times (L_i - L_{i-1})^2\}$$

[Equation 10]

Here, m, p, a, u, q, z, s, and b are weight constants, and c is a smoothed constant for a sampling interval. In addition, $f^M$, $f^P$, $f^A$, $f^U$, $f^Q$, $f^Z$, $f^S$, and $f^B$ are sampling intervals that are determined using respective parameters. A function for finding the sampling interval for each parameter may be the same as or similar to the functions described in the above embodiments. The term $\{c*(L_i - L_{i-1})^2\}$ of Equation 10 is a term for guaranteeing that a sampling interval between continuous frames is smoothed. According to an example embodiment, a term may be added to or removed from Equation 10. For example, according to an example embodiment, the term $\{z*(L_i-f^Z(Z_i))^2\}$ that uses a zooming value may be removed.

The weight constants m, p, a, u, q, z, s, and b for the parameters may be set differently depending on embodiments and may be changed based on the parameters during the photographing.

Figure 24:
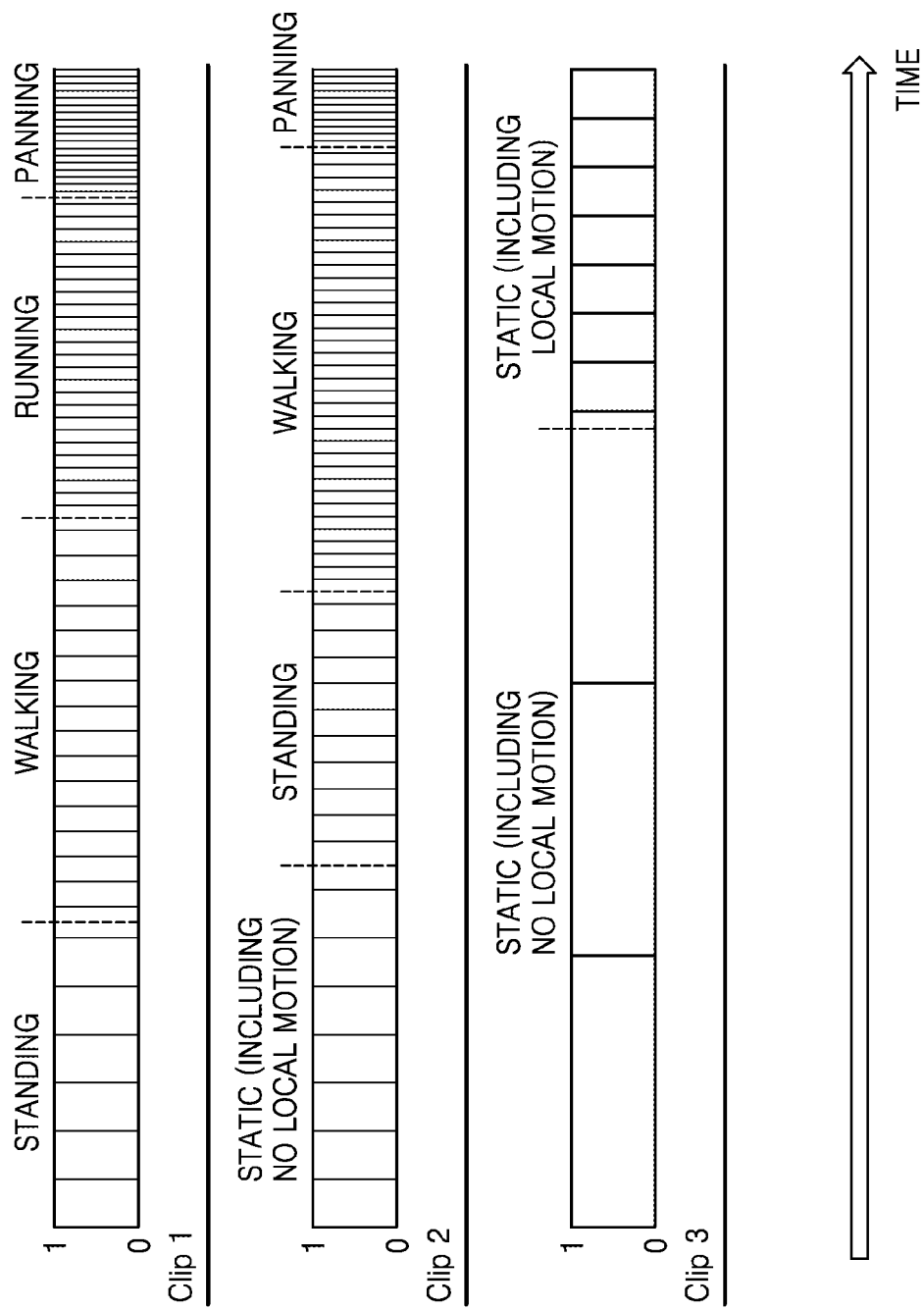
FIG. 24 is a diagram illustrating an example change in a sampling interval according to an example embodiment.

FIG. 24 is a diagram illustrating an example change in a sampling interval according to an example embodiment.

According to an example embodiment, as illustrated in FIG. 24, a sampling interval may be changed during a time lapse photographing time by adjusting the sampling interval using a reference value while the time lapse photographing is performed. For example, in Clip 1, the sampling interval may decrease when a photographer changes from a standing state (STANDING) to a walking state (WALKING), and may further decrease when the photographer changes to a running state (RUNNING) and further decrease when an operation is performed in a panning mode (PANNING). As another example, in Clip 2, the sampling interval may decrease when the photographer changes from a static state in which there is local motion to the standing state (STANDING) while being positioned at the same position (STATIC), and may further decrease when the photographer changes to the walking state (WALKING) and further decrease when an operation is performed in a panning mode (PANNING). As another example, when the photographer changes from a state in which there is no local motion to a state in which there is local motion while being positioned at the same position (STATIC), the sampling interval may decrease as illustrated, for example, in Clip 3.

Figure 25:
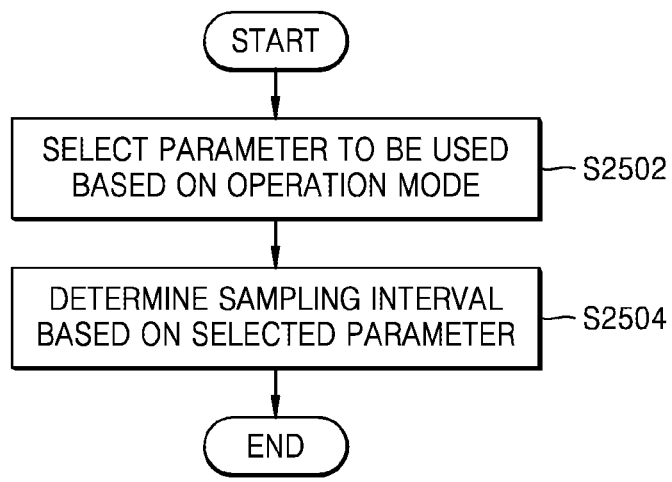
FIG. 25 is a flowchart illustrating an example method of determining a final sampling interval according to an example embodiment.

FIG. 25 is a flowchart illustrating an example method of determining a final sampling interval according to an example embodiment.

According to an example embodiment, the processor 120 selects a parameter to be used as a reference value to determine a sampling interval based on an operation mode of a photographing apparatus 100 (S2502). For example, in order to determine the sampling interval, the processor 120 may use a moving speed of a photographing apparatus, an audio signal, and a zooming value in a sport mode, and may use the presence of face detection, a face size, and an audio signal in a portrait mode.

When the parameter to be used to determine the sampling interval is selected, the processor 120 determines the sampling interval based on the selected parameter (S2504).

Figure 26:
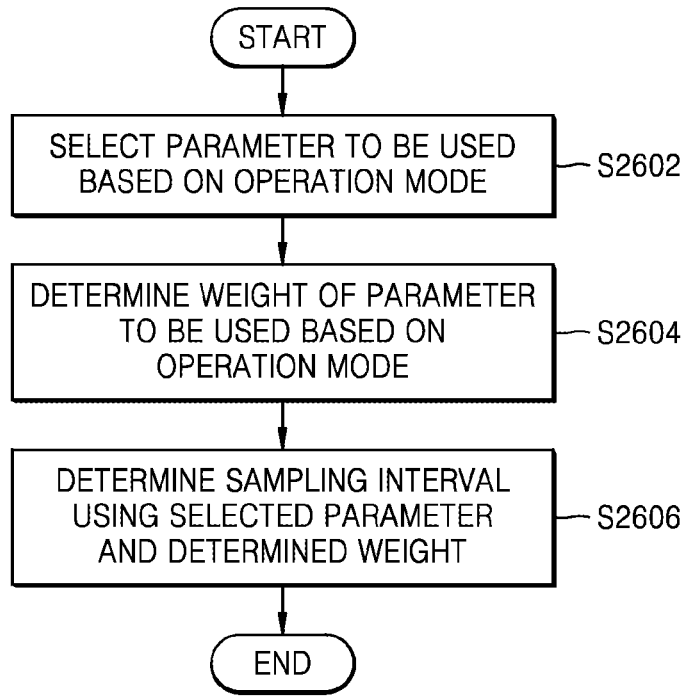
FIG. 26 is a flowchart illustrating an example method of determining a sampling interval according to an example embodiment.

FIG. 26 is a flowchart illustrating an example method of determining a sampling interval according to an example embodiment.

According to an example embodiment, the method includes determining a parameter to be used as a reference value to determine a sampling interval according to an operation mode and a weight of the parameter.

The processor 120 selects a parameter to be used as a reference value to determine a sampling interval based on an operation mode of a photographing apparatus 100 (S2602). For example, in order to determine the sampling interval, the processor 120 may use a moving speed of a photographing apparatus, an audio signal, and a zooming value in a sport mode, and may use the presence of face detection, a face size, and an audio signal in a portrait mode.

The processor 120 determines a weight of the parameter to be used based on the operation mode (S2604). For example, in the sport mode, the processor 120 may set weights of the moving speed and the zooming value to be high and may set a weight of the audio signal to be low. As another example, in a portrait mode, the processor 120 may increase weights of the presence of the face detection and the face size and may decrease a weight of the audio signal. For example, the weights may include weight constants m, p, a, u, q, z, s, and b in Equation 10 above. According to an example embodiment, the weight constants m, p, a, u, q, z, s, and b may be changed based on the operation mode.

The processor 120 determines the sampling interval using the selected parameter and the determined weight (S2606).

Figure 27:
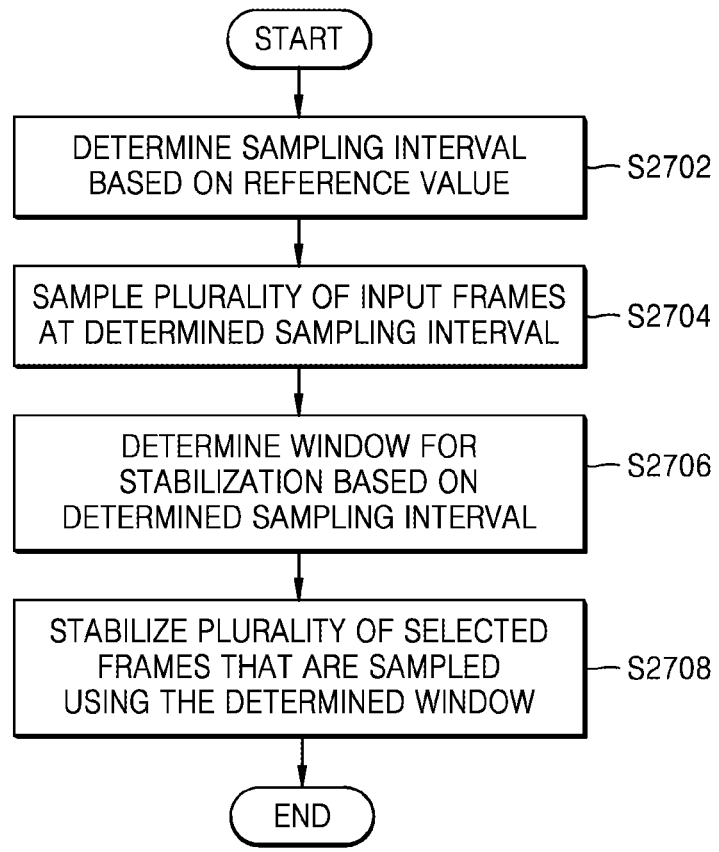
FIG. 27 is a flowchart illustrating an example process of stabilizing a time lapse image according to an example embodiment.

FIG. 27 is a flowchart illustrating an example process of stabilizing a time lapse image according to an example embodiment.

According to an example embodiment, the processor 120 may perform the stabilization process before generating a time lapse image file from the selected frames. The stabilization process is, for example, an image processing process of electronically correcting a sudden change in an image that is caused by movement of a photographer or a subject such that the time lapse image may be smoothly played back. Stability obtained by the stabilization process may be acquired in exchange for field-of-view (FOV) loss. Accordingly, input frame resolution of the video stabilization process is greater than a stabilized output frame. As the FOV loss increases, the stability may be enhanced by the video stabilization process.

According to an example embodiment, the stabilization process may be performed using an FOV window that defines a region of an image signal acquired from the image device, which is to be used as frame data. In order to perform the stabilization process, the window may horizontally or vertically move in a full frame of the image signal acquired from the imaging device.

The processor 120 determines the sampling interval based on a reference value (S2702), and samples a plurality of input frames at the determined sampling interval (S2704).

In addition, the processor 120 may determine a size of a window for performing a stabilization process based on the determined sampling interval (S2706). The size of the window may be expressed as the size of the window itself or may be expressed as a width or area (FOV loss) of a part of the input frame, which is not included in the window. According to an example embodiment, the window size may decrease when the sampling interval increases, and the window size may increase when the sampling interval decreases.

The processor 120 stabilizes a plurality of selected frames that are sampled using the determined window size (S2708). The stabilization process may be performed while or after the photographing is performed. When the stabilization process is performed after the end of the photographing, the window sizes for the selected frames may be stored separately until the stabilization process is performed. The processor 120 generates a time lapse image file using the stabilized selected frames.

Figure 28:
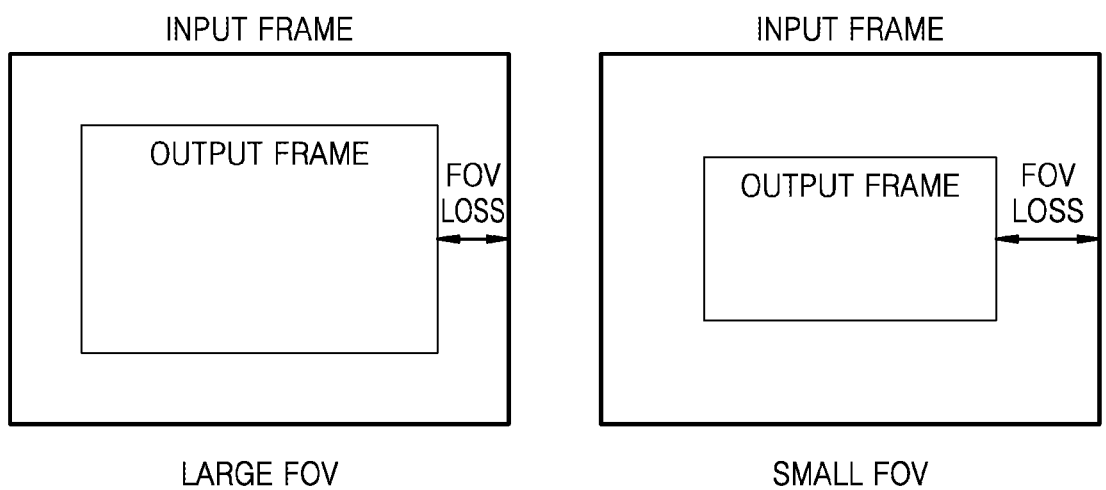
FIG. 28 is a diagram illustrating an example FOV loss and a window for stabilization.

FIG. 28 is a diagram illustrating an example FOV loss and a window for stabilization.

The window defines a part that is output from an input frame (INPUT FRAME) to an output frame (OUTPUT FRAME). The window may, for example, be defined as, for example, a quadrilateral frame indicating a part corresponding to an output frame (OUTPUT FRAME) in FIG. 28. The stabilization process smoothes continuous selected frames while moving the window. As illustrated in FIG. 28, the FOV loss may be determined as a width of a part of the input frame (INPUT FRAME) that is not included in the window.

Figure 29:
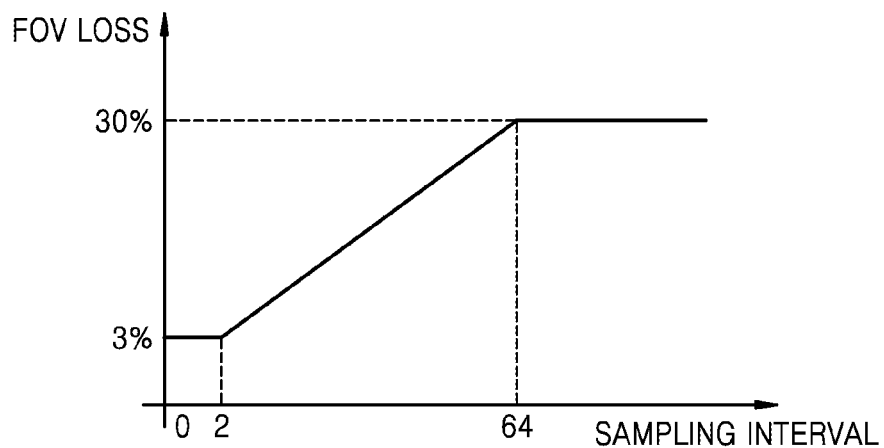
FIG. 29 is a graph illustrating an example relation between a sampling interval and an FOV loss according to an example embodiment.

FIG. 29 is a diagram illustrating an example relation between a sampling interval and an FOV loss according to an example embodiment.

According to an example embodiment, as the sampling interval increases, the FOV loss increases. For example, the FOV loss is a ratio of an area lost by the stabilization process to an entire area of the input frame.

For the same photographing apparatus, as the sampling interval increases, the time lapse image may be further destabilized. Accordingly, as the sampling interval increases, strong stabilization is required. According to an example embodiment, the processor 120 may increase the FOV loss as the sampling interval increases, thus enhancing the stabilization performance. Similarly, as the sampling interval decreases, the FOV loss decreases.

According to an example embodiment, the FOV loss (r) may be determined using a function of the sampling interval (s), as shown in Equation 11 below.

$$r = \begin{cases} 0.03 & s \leq 2 \\ 0.0043548 \times s + 0.02129 & 2 < s < 64 \\ 0.3 & s \geq 64 \end{cases} \quad \text{[Equation 11]}$$

The graph of FIG. 29 illustrates a relation between the sampling interval s and the FOV loss r according to Equation 11.

Figure 30:
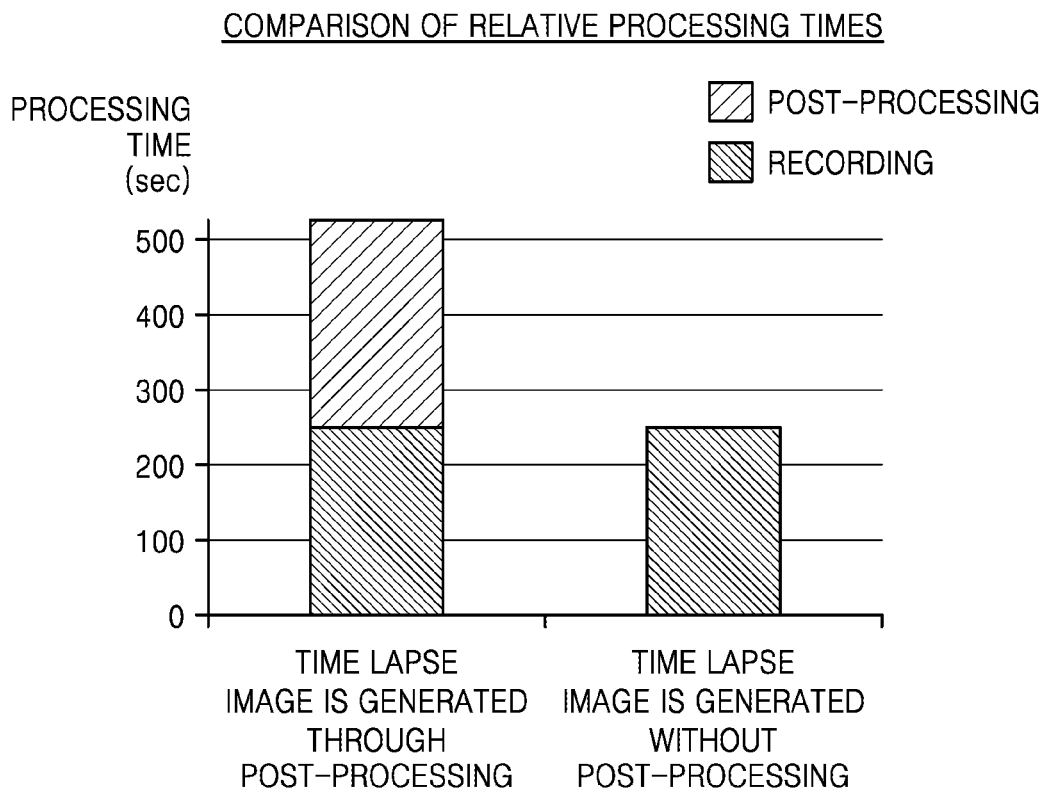
FIG. 30 is a graph illustrating an example comparing a processing time according to an example embodiment of the present disclosure with a case in which a time lapse image is generated through post-processing.

FIG. 30 is a graph comparing relative processing times according to an example embodiment of the present disclosure with a case in which a time lapse image is generated through post-processing.

When the time lapse image is generated through post-processing, the photographing apparatus stores all input frames upon the photographing, selects frames to be included in the time lapse image by setting the time lapse sampling interval constantly or adaptively, and then generates the time lapse image file from the selected frames. In this example, after the end of the photographing, the photographing apparatus should determine the sampling interval, sample a frame, perform a stabilization process, and generate a time lapse image file. Thus, a time needed for post-processing is required.

On the other hand, according to various example embodiments of the present disclosure, since a process of determining the sampling interval and sampling the frame is performed while the photographing is performed, a time needed for the post-processing is not additionally required after the photographing (e.g., time lapse image generated without post-processing). Accordingly, the embodiments of the present disclosure may significantly decrease a processing time needed to generate the time lapse image.

Figure 31:
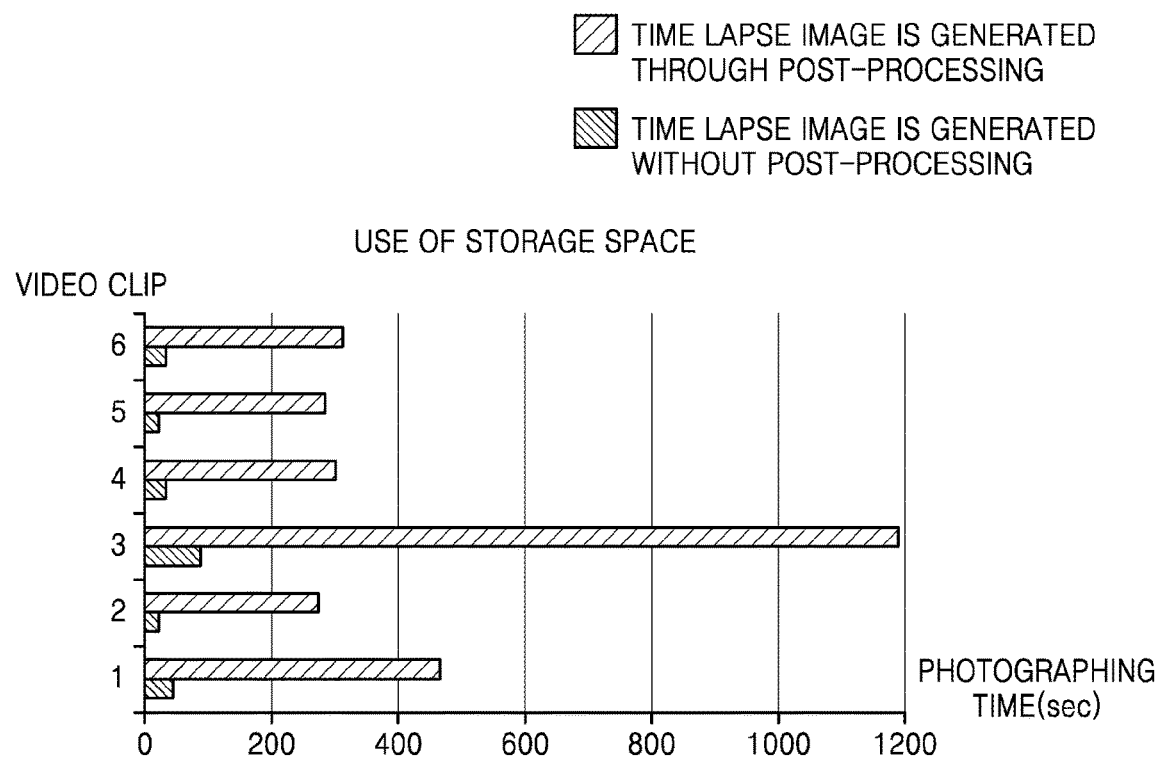
FIG. 31 is a diagram illustrating example storage space use amounts according to example embodiments of the present disclosure.

FIG. 31 is a diagram illustrating example relative storage space use amounts according to various embodiments of the present disclosure.

When the time lapse image is generated through post-processing, the photographing apparatus stores all input frames upon the photographing, selects frames to be included in the time lapse image by setting the time lapse sampling interval constantly or adaptively, and then generates the time lapse image file from the selected frames. In this example, the input frame upon the photographing may be preserved in a storage space until the post-processing is completed after the end of the photographing. On the other hand, according to various example embodiments of the present disclosure, by sampling frames to be included in a time lapse image during the photographing and discarding unselected frames, it is unnecessary to store all input frames until the end of the photographing, thus requiring only a space for storing frames to be stored in the time lapse file and a space for temporarily storing a predetermined number of input frames. Accordingly, as illustrated in FIG. 31, example embodiments of the present disclosure (e.g., time laps image generated without post-processing) may significantly decrease a required storage space, compared to a case in which the time lapse image is generated through post-processing.

Figure 32:
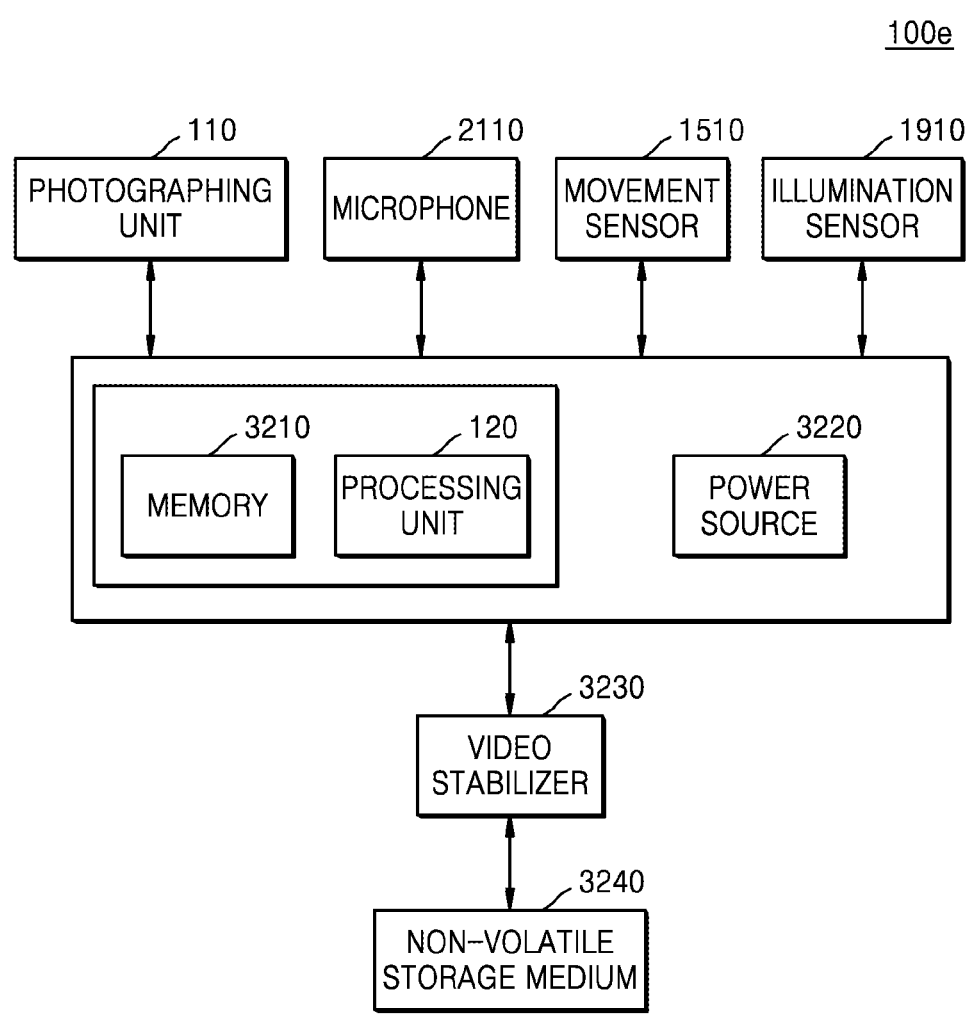
FIG. 32 is a block diagram illustrating an example structure of a photographing apparatus 100e according to an example embodiment.

FIG. 32 is a block diagram illustrating an example structure of a photographing apparatus 100e according to an example embodiment.

The photographing apparatus 100e according to an embodiment includes a photographing device (e.g., including imaging circuitry, for example, a camera) 110, a microphone 2110, a movement sensor 1510, an illumination sensor 1910, a memory 3210, a processor (e.g., including processing circuitry) 120, a power source 3220, a video stabilizer (e.g., including video stabilizing circuitry) 3230, and a non-volatile storage medium 3240.

The type of sensor included in the photographing apparatus 100e may vary depending on the various example embodiments. FIG. 32 illustrates an example in which the photographing apparatus 100e includes the microphone 2110, the movement sensor 1510, and the illumination sensor 1910.

The processor 120 may determine a sampling interval during photographing using an audio signal detected from the microphone 2110, movement information of the photographing apparatus 100e detected from the movement sensor 1510, and an illumination value detected from the illumination sensor 1910.

The memory 3210 serves as a main memory and may be implemented as, for example, a dynamic RAM (DRAM) or a static RAM (SRAM). The memory 3210 may store a predetermined number of input frames and selected frames while the time lapse photographing is performed. The video stabilizer 3230 may include various circuitry that performs a video stabilization process on the selected frames stored in the memory 3210 and then stores the selected frames in the memory 3210 again. The processor 120 may perform a video compression process on the stabilized selected frames to generate a time lapse image file and then store the generated time lapse image file in the non-volatile storage medium 3240.

When video photographing and recording or time lapse photographing and recording are performed by the photographing apparatus 100e, the video stabilizer 3230 performs a video stabilization process on frames to be generated as a video file. According to an example embodiment, the video stabilizer 3230 may include various circuitry that performs video encoding or decoding, and may be implemented in the form of a video card including various video stabilizer circuitry that is separate from the processor 120 which may, for example, be a main processor.

The non-volatile storage medium 3240 is an element corresponding to the storage 130 and may store various types of data files, program files, etc. The storage medium 3240 according to an example embodiment stores the time lapse image file. In addition, depending on various example embodiments, the non-volatile storage medium 3240 may store a pre-registered sound, a pre-registered word, a pre-registered face, a reference value, and various types of functions and parameters, etc., which are used to determine the sampling interval. The non-volatile storage medium 3240 may be implemented in the form of an internal memory or a removable external memory. The non-volatile storage medium 3240 may be implemented using, for example, a flash memory (e.g., a NAND flash memory or NOR flash memory), a hard drive, or a solid state drive (SSD). When the non-volatile storage medium 3240 is removably implemented, the non-volatile storage medium 3240 may be implemented in the form of a compact flash (CF), a secure digital (SD) card, a micro SD card, a mini SD card, an extreme digital (xD) card, a multi-media card (MMC), or memory stick.

The power source 3220 supplies a driving power to the photographing apparatus 100*e*. According to an example embodiment, the power source 3220 may, for example, be implemented in the form of a removable battery or an internal battery. In addition, the battery may be implemented as a primary cell or a secondary cell. The battery may include, for example, a lithium cell, a lithium polymer cell, a Ni-MH cell, a Ni—Cd cell, or a Ni-MH cell. According to another embodiment, the power source 3220 may be implemented in the form of a power module connected with an external power source.

Figure 33:
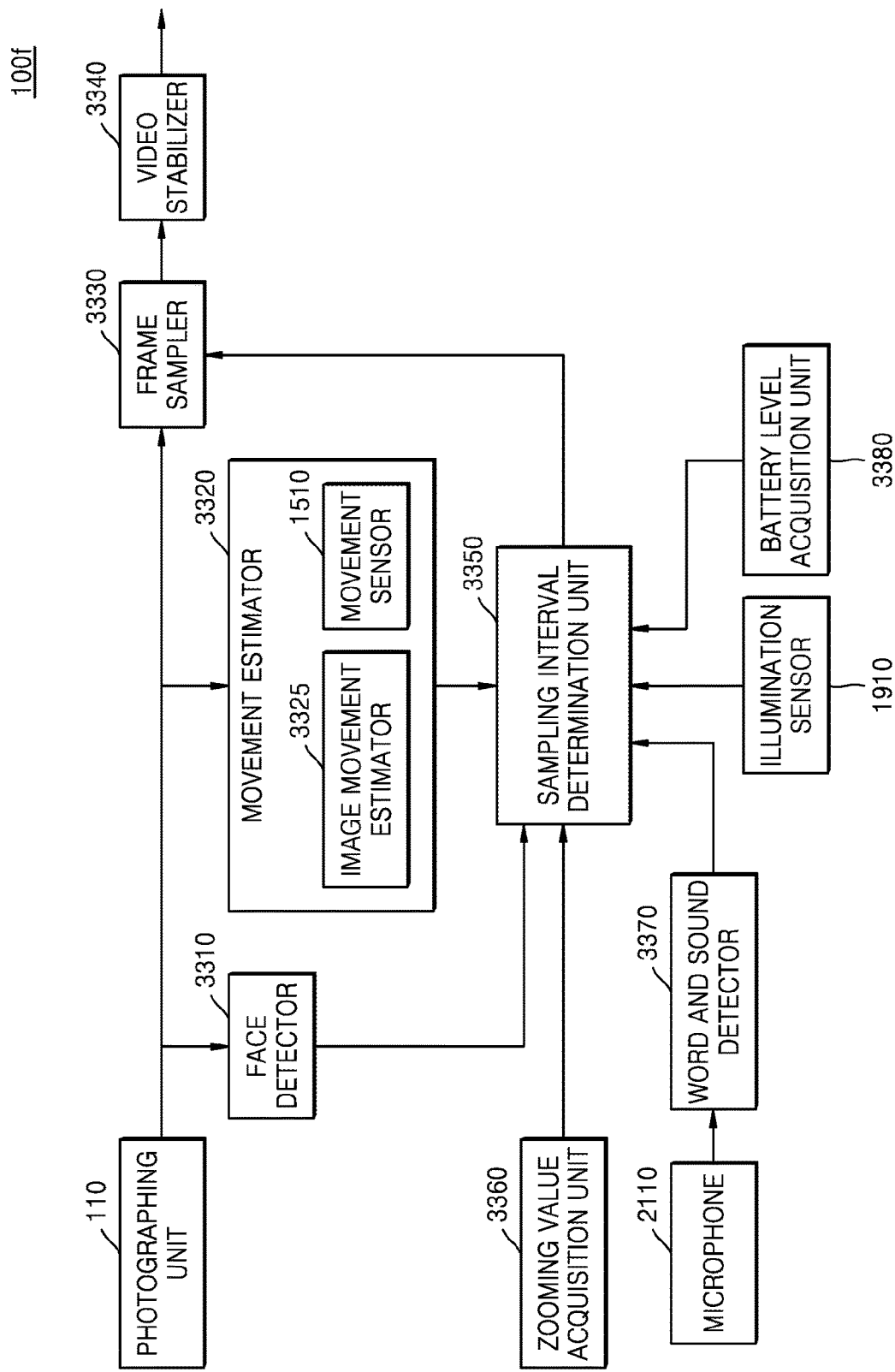
FIG. 33 is a diagram illustrating an example structure of a photographing apparatus 100f according to an example embodiment.

FIG. 33 is a diagram illustrating an example structure of a photographing apparatus 100*f* according to an example embodiment.

According to an example embodiment, the photographing apparatus 100*f* includes a photographing device (e.g., including imaging circuitry, such as a camera) 110, a face detector (e.g., including face detecting circuitry) 3310, a movement estimator (e.g., including movement estimating circuitry) 3320, a frame sampler 3330, a video stabilizer (e.g., including video stabilizer circuitry) 3340, a sampling interval determination unit (e.g., including sampling interval determining circuitry) 3350, a zooming value acquisition unit (e.g., including zooming value acquisition circuitry) 3360, a microphone 2110, a word and sound detector 3370, an illumination sensor 1910, and a battery level acquisition unit (e.g., including battery level acquisition circuitry) 3380.

In the example of FIG. 33, each of the face detector 3310, the movement estimator 3320, the frame sampler 3330, the video stabilizer 3340, the sampling interval determination unit 3350, the zooming value acquisition unit 3360, the word and sound detector 3370, and the battery level acquisition unit 3380 may be configured as an independent hardware module including various circuitry configured to perform the various functions of the various modules, a software module, or a combination of the hardware module and the software module. In addition, some or all of the face detector 3310, the movement estimator 3320, the frame sampler 3330, the video stabilizer 3340, the sampling interval determination unit 3350, the zooming value acquisition unit 3360, the word and sound detector 3370, and the battery level acquisition unit 3380 may be implemented as software modules and appropriately distributed to one or more hardware modules. The face detector 3310, an image movement estimator 3325, the frame sampler 3330, the video stabilizer 3340, the sampling interval determination unit 3350, the zooming value acquisition unit 3360, the word and sound detector 3370, and the battery level acquisition unit 3380 may correspond to the above-described processor 120.

When an input frame is generated from an image signal of the photographing device 110, the input frame is transferred to the face detector 3310, the movement estimator 3320, and the frame sampler 3330.

The face detector 3310 detects a face from input frames, acquires face size information, and provides information about whether the face is detected and the face size information to the sampling interval determination unit 3350. According to an example embodiment, the face detector 3310 performs face recognition, determines whether the detected face is a face pre-registered with the photographing apparatus 100*f*, and provides a result of the determination to the sampling interval determination unit 3350. According to an example embodiment, the face detector 3310 determines whether the detected face is a face of a person, a face of an animal, or a face of a baby and provides a result of the determination to the sampling interval determination unit 3350.

The movement estimator 3320 detects information about movement of the photographing apparatus 100*f*. The movement estimator 3320 includes the image movement estimator 3325 and a movement sensor 1510. The image movement estimator 3325 detects the global motion of the photographing apparatus 100*f* and the local motion of a subject from the input frames. Depending on embodiments, the image movement estimator 3325 may detect both or any one of the global motion and the local motion. The movement sensor 1510 is a sensor that detects movement of the photographing apparatus 100*f* and may be implemented using various circuitry, such as an acceleration sensor, a gyro sensor, etc. When the movement sensor 1510 is provided separately, the image movement estimator 3325 may not perform a process for estimating the global motion. The movement estimator 3320 provides information (global motion) about movement of the photographing apparatus 100*f* and information (local motion) about movement of the subject to the sampling interval determination unit 3350.

The zooming value acquisition unit 3360 acquires a zoom factor value as a zooming value. For the optical zoom, the zoom factor may be determined from a focal distance. For the digital zoom, the zoom factor is known to the photographing apparatus 100*f*. The zooming value acquisition unit 3360 provides the acquired zooming value to the sampling interval determination unit 3350.

The word and sound detector 3370 detects a pre-registered word and sound from an audio signal detected from the microphone 2110. The word and sound detector 3370 may detect a pre-registered word and sound using various word detection algorithms and/or sound detection algorithms. The word and sound detector 3370 may provide one or a combination of information about whether a pre-registered word or sound is detected and information about which word or sound is detected to the sampling interval determination unit 3350. According to an example embodiment, the sampling interval determination unit 3350 may set a degree to which the sampling interval decreases differently depending on the type of the word or sound.

The illumination sensor 1910 provides information about ambient brightness to the sampling interval determination unit 3350.

The battery level acquisition unit 3380 acquires information about a battery level indicating a residual quantity of a battery included in the photographing apparatus 100*f*. The battery level may be detected from a voltage level or a current level detected from a battery-associated circuit. The battery level acquisition unit 3380 provides information about the battery level to the sampling interval determination unit 3350.

The sampling interval determination unit 3350 determines a sampling interval upon time lapse photographing using information provided from the face detector 3310, the movement estimator 3320, the zooming value acquisition unit 3360, the word and sound detector 3370, the illumination sensor 1910, and the battery level acquisition unit 3380 as a reference value, and then provides the determined sampling interval to the frame sampler 3330.

The frame sampler 3330 samples selected frames from among a plurality of input frames generated by the photographing device 110 using the sampling interval. The selected frames are output to the video stabilizer 3340, and the video stabilizer 3340 performs a video stabilization process on the selected frames. The stabilized selected frames are compressed to a time lapse image file.

Figure 34:
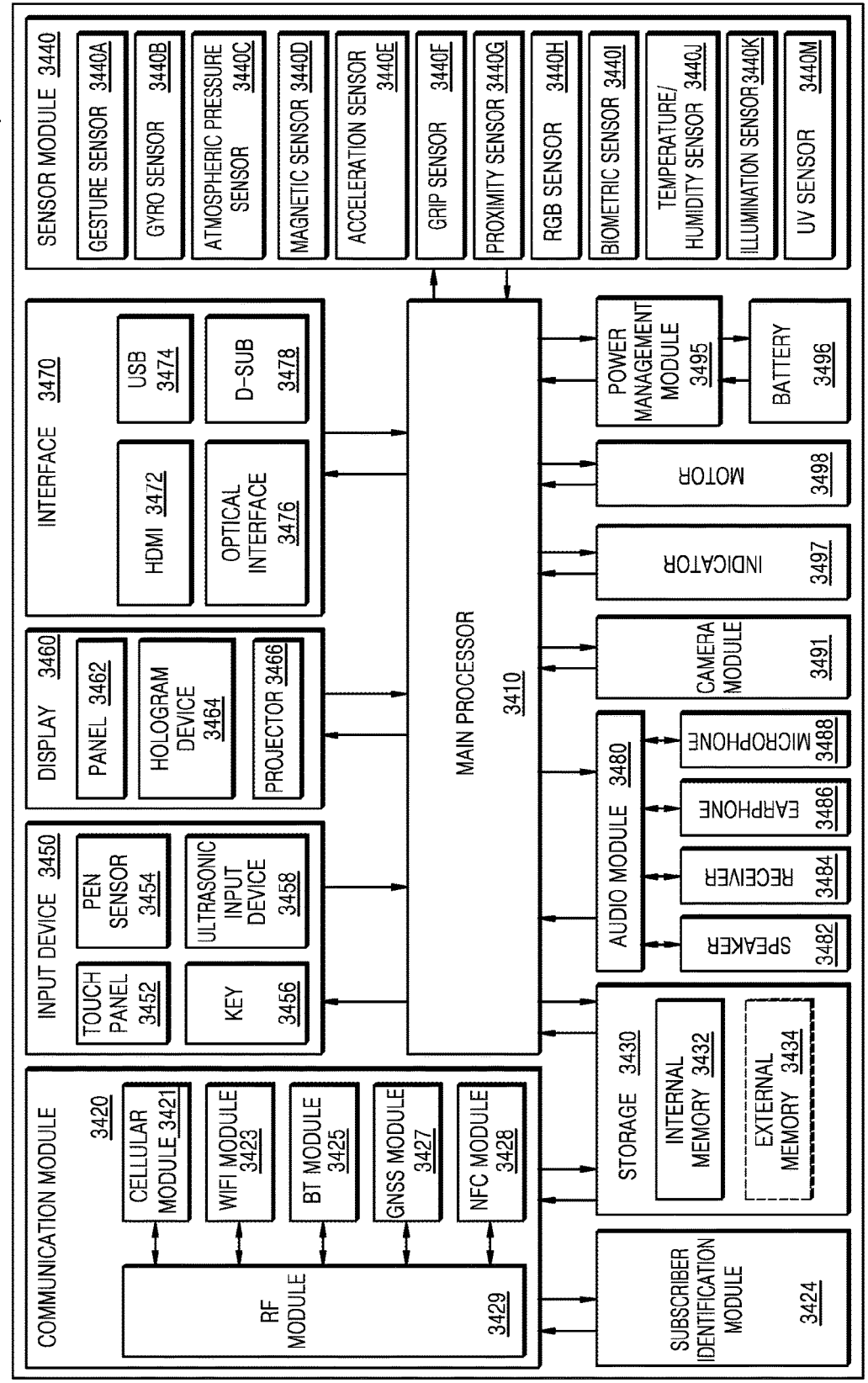
FIG. 34 is a block diagram illustrating an example structure of a photographing apparatus 100g according to an example embodiment.

FIG. 34 is a block diagram illustrating an example structure of a photographing apparatus 100g according to an example embodiment.

The photographing apparatus 100g according to an embodiment may include at least one processor (e.g., an application processor (AP) including processing circuitry) 3410, a communication module (e.g., including communication circuitry) 3420, a subscriber identification module 3424, a storage 3430, a sensor module 3440, an input device (e.g., including input circuitry) 3450, a display 3460, an interface (e.g., including interface circuitry) 3470, an audio module 3480, a camera module 3491, a power management module 3495, a battery 3496, an indicator 3497, and a motor 3498.

The main processor 3410, for example, may control a plurality of hardware or software components connected to the main processor 3410 and also may perform various data processing and operations by running an operating system or an application program. The main processor 3410, for example, may be implemented as various processing circuitry, a system-on-chip (SoC), or the like. According to an example embodiment, the main processor 3410 may further include a graphic processor (GPU) and/or an image signal processor. The main processor 3410 may load commands or data received from at least one of other components (e.g., a non-volatile memory) into a volatile memory to process the commands, and may store various types of data in a non-volatile memory.

The main processor 3410 according to an example embodiment may correspond to the processor 120 of FIG. 3, FIG. 15, FIG. 19, or FIG. 21.

The communication module 3420 may include various communication circuitry, such as, for example, and without limitation, a cellular module 3421, a WiFi module 3423, a Bluetooth (BT) module 3425, a global navigation satellite system (GNSS) module 3427 (e.g., a GPS module, a GLONASS module, a BEIDOU module, or a GALILEO module), an NFC module 3428, and a radio frequency (RF) module 3429.

The storage 3430 may include, for example, an internal memory 3432 or an external memory 3434. The internal memory 3432 may include, for example, at least one of a volatile memory (e.g., a dynamic random access memory (DRAM), a static RAM (SRAM), or a synchronous dynamic RAM (SDRAM)) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash or NOR flash), a hard drive, or a solid state drive (SSD)).

The external memory 3434 may further include a flash drive, for example, a compact flash (CF), a secure digital (SD) card, a micro SD card, a mini SD card, an extreme digital (xD) card, a multi-media card (MMC), or memory stick. The external memory 3434 may be functionally and/or physically connected to the photographing apparatus 100g through various interfaces.

The storage 3430 may correspond to the above-described storage 130.

The sensor module 3440, for example, may measure a physical quantity or sense an operation state of the photographing apparatus 100g and may convert the measured or sensed information into an electrical signal. The sensor module 3440 may include at least one of, for example, a gesture sensor 3440A, a gyro sensor 3440B, an atmospheric pressure sensor 3440C, a magnetic sensor 3440D, an acceleration sensor 3440E, a grip sensor 3440F, a proximity sensor 3440G, a color sensor 3440H (e.g., a red, green, and blue (RGB) sensor), a biometric sensor 3440I, a temperature/humidity sensor 3440J, an illumination sensor 3440K, and an ultra violet (UV) sensor 3440M. The sensor module 3440 may further include a control circuit for controlling one or more sensors included therein. According to an example embodiment, the photographing apparatus 100g may further include a processor configured to control the sensor module 3440 as part of or separately from the main processor 3410, and thus may control the sensor module 3440 while the main processor 3410 is in a sleep state. The sensor module 3440 need not include all the sensors 3440A to 3440M illustrated in FIG. 34, and may be implemented in various combinations of the sensors 3440A to 3440M.

The gesture sensor 3440A, the gyro sensor 3440B, and the acceleration sensor 3440E may correspond to the movement sensor 1510 of FIG. 15, and the illumination sensor 3440K may correspond to the illumination sensor 1910 of FIG. 19.

The input device 3450, for example, may include various input circuitry, such as, for example, and without limitation, a touch panel 3452, a (digital) pen sensor 3454, a key 3456, or an ultrasonic input device 3458. The touch panel 3452, for example, may use at least one of capacitive, resistive, infrared, and ultrasonic methods. Additionally, the touch panel 3452 may further include a control circuit. The touch panel 3452 may further include a tactile layer to provide a tactile response to a user.

The (digital) pen sensor 3454, for example, may be a portion of the touch panel or may include a separate recognition sheet. The key 3456 may include, for example, a physical button, an optical key, or a keypad. The ultrasonic input device 3458 may sense ultrasonic waves generated from an input tool through a microphone (e.g., a microphone 3488) to check data corresponding to the detected ultrasonic waves.

The display 3460 (e.g., the display 160) may include a panel 3462, a hologram device 3464, or a projector 3466. The panel 3462 may be implemented to be flexible, transparent, or wearable, for example. The panel 3462 and the touch panel 3452 may be configured as one module.

The interface 3470 may include various interface circuitry, such as, for example, and without limitation, a High-Definition Multimedia Interface (HDMI) 3472, a Universal Serial Bus (USB) 3474, an optical interface 3476, or a D-subminiature (D-sub) 3478, for example.

For example, the audio module 3480 may bi-directionally convert a sound and an electrical signal. The audio module 3480 may process sound information that is input or output through, for example, a speaker 3482, a receiver 3484, an earphone 3486, or the microphone 3488.

The microphone 3488 may correspond to the microphone of FIG. 21.

The camera module 3491 is a device for photographing, for example, a still image and a moving image. According to an embodiment, the camera module 3491 may include at least one image sensor (e.g., a front sensor or a rear sensor), a lens, an image signal processor (ISP), or a flash (e.g., a light emitting diode (LED) or a xenon lamp).

The camera module 3491 may correspond to the photographing device 110.

The power management module 3495, for example, may manage power of the photographing apparatus 100g. According to an embodiment, the power management module 3495 may include a power management integrated circuit (PMIC), a charger IC, or a battery or fuel gauge. The PMIC may be of a wired and/or wireless charging type. The battery gauge may measure, for example, a residual quantity of the battery 3496 or a voltage, current, or temperature during the charging of the battery 3496.

The power management module 3495 may correspond to the power source 3220 of FIG. 32.

The indicator 3497 may indicate a specific state of the photographing apparatus 100g or a component thereof (e.g., the main processor 3410), for example, a booting state, a message state, or a charging state. The motor 3498 may convert an electrical signal into mechanical vibration, and may generate a vibration or haptic effect.

In addition, an example embodiment of the present disclosure may be implemented as a record medium including instructions executable by a computer such as a program module executed by the computer. A computer-readable medium may be any usable medium accessible by a computer and may include volatile and non-volatile media and discrete and integrated media. Also, the computer-readable medium may include both a computer storage medium and a communication medium. The computer storage medium includes the volatile and non-volatile media and the discrete and integrated media, which are implemented in any method or technique for storing information such as a computer readable instruction, data structure, program module, or other data. The communication module typically includes the computer readable instruction, data structure, program module, or other data and transmission mechanism of a modulated data signal such as a carrier and further includes any information transmission medium.

The above-described elements of the present disclosure may include one or more components, and the name of a corresponding element may vary depending on the type of the electronic device. According to various example embodiments, the photographing apparatus may include at least one of the aforementioned elements and may exclude some elements or add additional other elements. Since some of the elements of the photographing apparatus according to various example embodiments are combined into one entity, functions of the elements may be performed the same as before the combination.

According to example embodiments of the present disclosure, it is possible to adjust the sampling interval in real time while sampling the frames of the time lapse image.

According to example embodiments of the present disclosure, it is also possible to reduce a storage space and a post-process required when the time lapse image is generated, by adjusting the sampling interval of the time lapse image in real time.

According to example embodiments of the present disclosure, it is also possible to enhance image stabilization performance by adjusting the sampling interval of the time lapse image in real time.

The above description is merely illustrative, and it will be understood by those skilled in the art that various changes in form and details may be made therein without departing from the spirit and scope of the disclosure as defined by the appended claims. The above example embodiments are accordingly to be regarded as illustrative rather than restrictive. For example, while a single element may be distributed and then carried out, distributed elements may be carried out in a combination thereof.

Therefore, the scope of the disclosure is defined not by the detailed description of the disclosure but by the appended claims, and a variety of example embodiments within the scope will be construed as being included in the present disclosure.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A photographing apparatus comprising:
   a photographing device comprising imaging circuitry configured to generate an image signal by photoelectric conversion of incident light;
   a processor comprising processing circuitry configured to:
      determine a sampling interval of time lapse photographing over time based on a reference value acquired in real time while the time lapse photographing is performed,
      determine a window corresponding to a region of a full frame obtained from the photographing device, used for stabilizing frames, and having a size based on the sampling interval,
      sample a plurality of input frames generated from the image signal at the sampling interval while the time lapse photographing is performed, to stabilize a plurality of frames selected by sampling the plurality of input frames using data of a region corresponding to the window, and
      compress the plurality of selected frames at an output frame rate to generate a time lapse image file; and
   a storage configured to store the time lapse image file.

2. The photographing apparatus of claim 1, wherein the reference value includes one or more of a zooming value, a battery level, movement information of the photographing apparatus, an illumination value, an audio signal, movement information of a subject, presence of face detection, and a face size.

3. The photographing apparatus of claim 1, wherein
   the reference value includes a zooming value, and the processing circuitry is configured to decrease the sampling interval when the zooming value increases, and
   the processing circuitry is configured to increase the sampling interval when the zooming value decreases.

4. The photographing apparatus of claim 1, further comprising a battery configured to supply power to the photographing apparatus, wherein
   the reference value includes a battery level, and
   the processing circuitry is configured to increase the sampling interval when the battery level is less than a threshold battery reference value.

5. The photographing apparatus of claim 1, wherein
   the processing circuitry is configured to extract subject movement information from the plurality of input frames, the reference value includes the subject movement information, and in a tripod mode of the photographing apparatus, the processing circuitry is configured to decrease the sampling interval when a movement magnitude of the subject increases, and to increase the sampling interval when the movement magnitude of the subject decreases.

6. The photographing apparatus of claim 1, wherein
the processing circuitry is configured to detect a face from the plurality of input frames,
the reference value includes face detection information, and
the processing circuitry is configured to decrease the sampling interval when a face that was not detected from a previous frame is detected from a current frame, and to increase the sampling interval when a face was detected from the previous frame and no face is detected in the current frame.

7. The photographing apparatus of claim 1, wherein
the processing circuitry is configured to detect a face from the plurality of input frames,
the reference value includes face detection information, and
the processing circuitry is configured to decrease the sampling interval when a size of the detected face increases, and to increase the sampling interval when the size of the detected face decreases.

8. The photographing apparatus of claim 1, further comprising a movement sensor configured to detect movement of the photographing apparatus, wherein
the reference value includes a movement magnitude of the photographing apparatus, and
the processing circuitry is configured to decrease the sampling interval when a movement magnitude of the photographing apparatus increases, and to increase the sampling interval when the movement magnitude of the photographing apparatus decreases.

9. The photographing apparatus of claim 1, further comprising a movement sensor configured to detect movement of the photographing apparatus, wherein
the reference value includes movement information of the photographing apparatus,
the processing circuitry is configured to decrease the sampling interval when the photographing apparatus is detected as operating in a panning mode, and
while the photographing apparatus operates in the panning mode, the processing circuitry is configured to increase the sampling interval when a moving speed of the photographing apparatus decreases, and to decrease the sampling interval when the moving speed increases.

10. The photographing apparatus of claim 1, further comprising a movement sensor configured to detect movement of the photographing apparatus, wherein
the reference value includes movement information of the photographing apparatus, and
the processing circuitry is configured to decrease the sampling interval when a moving speed of the photographing apparatus is equal to or greater than a reference value.

11. The photographing apparatus of claim 1, further comprising an illumination sensor configured to detect illumination, wherein
the reference value includes an illumination value, and
the processing circuitry is configured to provide a sampling interval that is greater when the illumination value is less than a low-illumination reference value or when the illumination value is greater than a high-illumination reference value than a sampling interval when the illumination value is equal to or greater than the low-illumination reference value and equal to or less than the high-illumination reference value.

12. The photographing apparatus of claim 1, further comprising a microphone configured to detect an audio signal, wherein
the reference value includes the audio signal detected by the microphone, and
the processing circuitry is configured to decrease the sampling interval when a predefined sound or word is detected from the audio signal.

13. A method of generating a time lapse image, the method comprising:
determining a sampling interval of time lapse photographing over time based on a reference value acquired in real time while the time lapse photographing is performed;
determining a window corresponding to a region of a full frame obtained from a photographing device, used for stabilizing frames, and having a size based on the sampling interval;
sampling a plurality of input frames generated from an image signal provided by imaging circuitry of a photographing device at the sampling interval while the time lapse photographing is performed;
stabilizing a plurality of frames selected by sampling the plurality of input frames, using data of a region corresponding to the window;
compressing the plurality of selected frames at an output frame rate to generate a time lapse image file; and
storing the time lapse image file.

14. The method of claim 13, wherein the reference value acquired in real time includes one or more of a zooming value, a battery level, movement information of the photographing apparatus, an illumination value, an audio signal, movement information of a subject, presence of face detection, and a face size.

15. The method of claim 13, wherein
the reference value includes a zooming value, and
the sampling interval decreases when the zooming value increases, and the sampling interval increases when the zooming value decreases.

16. The method of claim 13, wherein
the reference value includes a battery level, and
the sampling interval increases when the battery level is less than a threshold battery reference value.

17. The method of claim 13, further comprising extracting subject movement information from the plurality of input frames,
wherein the reference value includes the subject movement information, and
in a tripod mode of the photographing apparatus, the sampling interval decreases when a movement magnitude of the subject increases, and increases when the movement magnitude of the subject decreases.

18. The method of claim 13, further comprising detecting a face from the plurality of input frames,
wherein the reference value includes face detection information, and
the sampling interval decreases when a face that was not detected from a previous frame is detected from a current frame, and increases when a face was detected from the previous frame and no face is detected in the current frame.

19. The method of claim 13, further comprising detecting a face from the plurality of input frames,
   wherein the reference value includes face detection information, and
   the sampling interval decreases when a size of the detected face increases, and increases when the size of the detected face decreases.

20. A non-transitory computer-readable recording medium having recorded thereon computer program code for use in generating a time lapse image, which, when executed by a processor, causes the processor to perform operations comprising:
   determining a sampling interval of time lapse photographing over time based on a reference value acquired in real time while the time lapse photographing is performed;
   determining a window corresponding to a region of a full frame obtained from a photographing device used for stabilizing frames, and having a size based on the sampling interval;
   sampling a plurality of input frames generated from an image signal provided by imaging circuitry of a photographing device at the sampling interval while the time lapse photographing is performed;
   stabilizing a plurality of frames selected by sampling the plurality of input frames, using data of a region corresponding to the window;
   compressing the plurality of selected frames at an output frame rate to generate a time lapse image file; and
   storing the time lapse image file.

21. The photographing apparatus of claim 1, wherein the size of the window decreases as the sampling interval increases, and increases as the sampling interval decreases.

22. The photographing apparatus of claim 1, wherein the processor is further configured to move the window within the full frame.

23. The method of claim 13, wherein the size of the window decreases as the sampling interval increases, and increases as the sampling interval decreases.

24. The method of claim 13, further comprising moving the window within the full frame.

* * * * *